United States Patent
Park et al.

(10) Patent No.: US 10,740,196 B2
(45) Date of Patent: *Aug. 11, 2020

(54) EVENT BATCHING, OUTPUT SEQUENCING, AND LOG BASED STATE STORAGE IN CONTINUOUS QUERY PROCESSING

(71) Applicant: Oracle International Corporation, Redwood Shores, CA (US)

(72) Inventors: Hoyong Park, San Jose, CA (US); Sandeep Bishnoi, Pleasanton, CA (US); Unmesh Anil Deshmukh, Nagpur (IN); Prabhu Thukkaram, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,855

(22) Filed: Feb. 19, 2019

(65) Prior Publication Data

US 2019/0179716 A1 Jun. 13, 2019

Related U.S. Application Data

(63) Continuation of application No. 15/161,043, filed on May 20, 2016, now Pat. No. 10,255,141.

(30) Foreign Application Priority Data

Oct. 22, 2015 (IN) ................................ 5688CHE2015
Oct. 22, 2015 (IN) ................................ 5689CHE2015
Oct. 22, 2015 (IN) ................................ 5690CHE2015

(51) Int. Cl.
*G06F 11/00* (2006.01)
*G06F 11/14* (2006.01)
(Continued)

(52) U.S. Cl.
CPC .......... *G06F 11/1471* (2013.01); *G06F 9/542* (2013.01); *G06F 11/1438* (2013.01);
(Continued)

(58) Field of Classification Search
CPC ............. G06F 11/1471; G06F 11/1438; G06F 11/0766; G06F 11/14; G06F 11/1443;
(Continued)

(56) References Cited

U.S. PATENT DOCUMENTS 6,584,581 B1 * 6/2003 Bay ..................... G06F 11/1458
714/16
7,246,211 B1 7/2007 Beloussov et al.
(Continued)

FOREIGN PATENT DOCUMENTS

WO 0142920 6/2001
WO 2012166397 12/2012

OTHER PUBLICATIONS

U.S. Appl. No. 12/534,384, Final Office Action dated Feb. 12, 2013, 14 pages.
(Continued)

*Primary Examiner* — Anthony J Amoroso
(74) *Attorney, Agent, or Firm* — Kilpatrick Townsend & Stockton LLP

(57) ABSTRACT

An event processing system is disclosed that processes events of an event stream and performs the recovery of events during system failure. The recovery of events is performed by generating output sequence numbers for each deterministic output event generated by the event processing system. In an embodiment, the event processing system determines a current output sequence number of a most recently transmitted output event in a output stream of events, a last output sequence number of an output event corresponding to a most recently processed batch of input
(Continued)

events and determines a set of one or more output events of the output stream to be transmitted based on the current sequence number and the last output sequence number. The event processing system then transmits the output events related to the application.

20 Claims, 13 Drawing Sheets

(51) Int. Cl.
*G06F 9/54* (2006.01)
*G06F 16/11* (2019.01)
*G06F 16/242* (2019.01)

(52) U.S. Cl.
CPC ........ *G06F 16/128* (2019.01); *G06F 16/2433* (2019.01); *G06F 2201/805* (2013.01); *G06F 2201/84* (2013.01)

(58) Field of Classification Search
CPC ............. G06F 11/1446; G06F 11/1479; G06F 16/2433; G06F 16/128; G06F 9/542; G06F 9/54; G06F 9/546; G06F 17/30088; G06F 17/30404; G06F 17/30477; G06F 17/30516; G06F 17/30548; G06F 2201/805; G06F 2201/84; G06F 2201/87
See application file for complete search history.

(56) References Cited

U.S. PATENT DOCUMENTS

| | | | |
|---|---|---|---|
| 7,512,829 B2* | 3/2009 | Mital | G06F 1/14 713/502 |
| 7,844,829 B2 | 11/2010 | Meenakshisundaram | |
| 7,996,388 B2 | 8/2011 | Jain et al. | |
| 8,296,316 B2 | 10/2012 | Jain et al. | |
| 8,386,466 B2 | 2/2013 | Park et al. | |
| 8,527,458 B2 | 9/2013 | Park et al. | |
| 9,674,249 B1* | 6/2017 | Kekre | H04L 65/60 |
| 10,127,120 B2 | 11/2018 | Park et al. | |
| 10,579,576 B2* | 3/2020 | Kuehm | H04L 12/4625 |
| 2004/0168107 A1 | 8/2004 | Sharp et al. | |
| 2005/0154740 A1 | 7/2005 | Day et al. | |
| 2006/0085592 A1 | 4/2006 | Ganguly et al. | |
| 2006/0106786 A1 | 5/2006 | Day et al. | |
| 2007/0067586 A1 | 3/2007 | Mikami | |
| 2007/0294217 A1 | 12/2007 | Chen et al. | |
| 2008/0109619 A1 | 5/2008 | Nakanishi | |
| 2008/0235298 A1 | 9/2008 | Lin et al. | |
| 2009/0070786 A1 | 3/2009 | Alves et al. | |
| 2009/0106190 A1 | 4/2009 | Srinivasan et al. | |
| 2009/0106214 A1 | 4/2009 | Jain et al. | |
| 2009/0106321 A1 | 4/2009 | Das et al. | |
| 2009/0228434 A1 | 9/2009 | Krishnamurthy et al. | |
| 2009/0245236 A1 | 10/2009 | Scott et al. | |
| 2009/0265324 A1 | 10/2009 | Mordvinov et al. | |
| 2010/0161589 A1 | 6/2010 | Nica et al. | |
| 2012/0297249 A1 | 11/2012 | Yang et al. | |
| 2012/0304003 A1* | 11/2012 | Goldstein | G06F 11/1438 714/15 |
| 2014/0095471 A1 | 4/2014 | Deshmukh et al. | |
| 2014/0304545 A1* | 10/2014 | Chen | G06F 11/1438 714/4.3 |
| 2015/0248461 A1* | 9/2015 | Theeten | G06F 16/24568 707/718 |

OTHER PUBLICATIONS

U.S. Appl. No. 12/534,384, Non-Final Office Action dated Feb. 28, 2012, 13 pages.
U.S. Appl. No. 12/534,384, Notice of Allowance dated May 7, 2013, 12 pages.
U.S. Appl. No. 12/534,398, Final Office Action dated Jun. 5, 2012, 17 pages.
U.S. Appl. No. 12/534,398, Non-Final Office Action dated Nov. 1, 2011, 15 pages.
U.S. Appl. No. 12/534,398, Notice of Allowance dated Nov. 27, 2012, 10 pages.
U.S. Appl. No. 15/161,043, Final Office Action dated Aug. 3, 2018, 17 pages.
U.S. Appl. No. 15/161,043, First Action Interview Office Action Summary dated Apr. 27, 2018, 8 pages.
U.S. Appl. No. 15/161,043, First Action Interview Pilot Program Pre-Interview Communication dated Mar. 15, 2018, 7 pages.
U.S. Appl. No. 15/161,043, Notice of Allowance dated Nov. 27, 2018, 11 pages.
U.S. Appl. No. 15/161,062, First Action Interview Pilot Program Pre-Interview Communication dated Jun. 1, 2018, 5 pages.
U.S. Appl. No. 15/161,062, Notice of Allowance dated Jul. 10, 2018, 11 pages.
International Application No. PCT/US2016/035811, International Preliminary Report on Patentability dated Jan. 18, 2018, 8 pages.
International Application No. PCT/US2016/035811, International Search Report and Written Opinion dated Sep. 2, 2016, 10 pages.
International Application No. PCT/US2016/035811, Written Opinion dated Sep. 1, 2017, 6 pages.

* cited by examiner

| Operator Type | Event Batch B1 | Event Batch B2 | Event Batch B3 | Event Batch B4 |
|---|---|---|---|---|
| Window | Full Snapshot | Journaled Snapshot | Journaled Snapshot | Full Snapshot |
| Aggr | Full Snapshot | Full Snapshot | Full Snapshot | Full Snapshot |
| groupBy | Full Snapshot | Journaled Snapshot | Journaled Snapshot | Full Snapshot |

FIG. 10

EVENT BATCHING, OUTPUT SEQUENCING, AND LOG BASED STATE STORAGE IN CONTINUOUS QUERY PROCESSING

CROSS-REFERENCE TO RELATED APPLICATION

The present application is a continuation of, and claims the benefit and priority to U.S. application Ser. No. 15/161,043, filed May 20, 2016, entitled "EVENT BATCHING, OUTPUT SEQUENCING, AND LOG BASED STATE STORAGE IN CONTINUOUS QUERY PROCESSING", which claims the benefit and priority of India Provisional Patent Application No. 5688/CHE/2015, filed Oct. 22, 2015, entitled, "MICRO BATCHING WITH CHECKPOINT MARKING IN CONTINUOUS QUERY PROCESSING", India Provisional Patent Application No. Application No. 5689/CHE/2015, filed Oct. 22, 2015, entitled, "OUTPUT SEQUENCING FOR EXACT-ONCE SEMANTICS IN CONTINUOUS QUERY PROCESSING", and India Provisional Patent Application No. 5690/CHE/2015, filed Oct. 22, 2015, entitled, "LOG BASED FAST STATE STORAGE FOR FAILOVER IN CONTINUOUS QUERY PROCESSING," the entire contents of each are hereby incorporated by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for processing events of an event stream. In an embodiment, an event processing system is disclosed that processes events of an event stream and performs the recovery of events in an event stream in the event of system failure.

In certain embodiments, an event processing system is disclosed that comprises a memory storing a plurality of instructions and one or more processors configured to access the memory. The processors are configured to receive a continuous input stream of events related to an application, process the continuous input stream of events to generate an output stream of events related to the application and determine an output sequence number for an output event in the output stream of events. The processors are further configured to transmit the output event comprising the output stream of events and store the output sequence number of the output event. In some embodiments, processors are configured to receive an indication of failure of the system while the continuous input stream of events is being processed. The processors are configured to determine a current output sequence number of a most recently transmitted output event in the output stream of events, determine a last output sequence number of an output event corresponding to a most recently processed batch of input events and determine a set of one or more output events of the output stream to be transmitted based at least in part on the current sequence number and the last output sequence number. In some embodiments, the processors are further configured to transmit the set of one or more output events related to the application.

In some embodiments, the processors are further configured to not include one or more output events in the set of one or more output events to be transmitted. In some embodiments, the processors are configured to transmit output events from the current output sequence number of the most recently transmitted output event in the output stream of events based on receiving the indication of failure of the system.

In some embodiments, the processors are further configured to generate a set of one or more event batches from the continuous input stream of events by generating a checkpoint marker event, inserting the checkpoint marker event into the continuous input stream of events, and generating the set of one or more event batches based at least in part on the checkpoint marker event. In some examples, the checkpoint marker event represents information related to an input event in the continuous input stream of events. In some examples, a size of an event batch is determined based at least in part on the checkpoint marker event.

In some embodiments, the processors are further configured to process the checkpoint marker event, transmit an acknowledgement message indicating completion of processing of a first event batch in the set of one or event batches based at least in part on the processing of the checkpoint marker event and generate a snapshot of a current state of the system. In some examples, the snapshot of the current state of the system comprises information related to at least one of an input queue state, an operator state, or an output queue state related to at least the first batch of events. In some embodiments, the processors are configured to store the output sequence number of an output event in the output stream of events as part of the snapshot.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 10 is an exemplary table that depicts the generation of different types of snapshots for different types of operators of a continuous query that are identified during the processing of events in an event stream, in accordance with an embodiment of the present disclosure.

DETAILED DESCRIPTION

Figure 1:
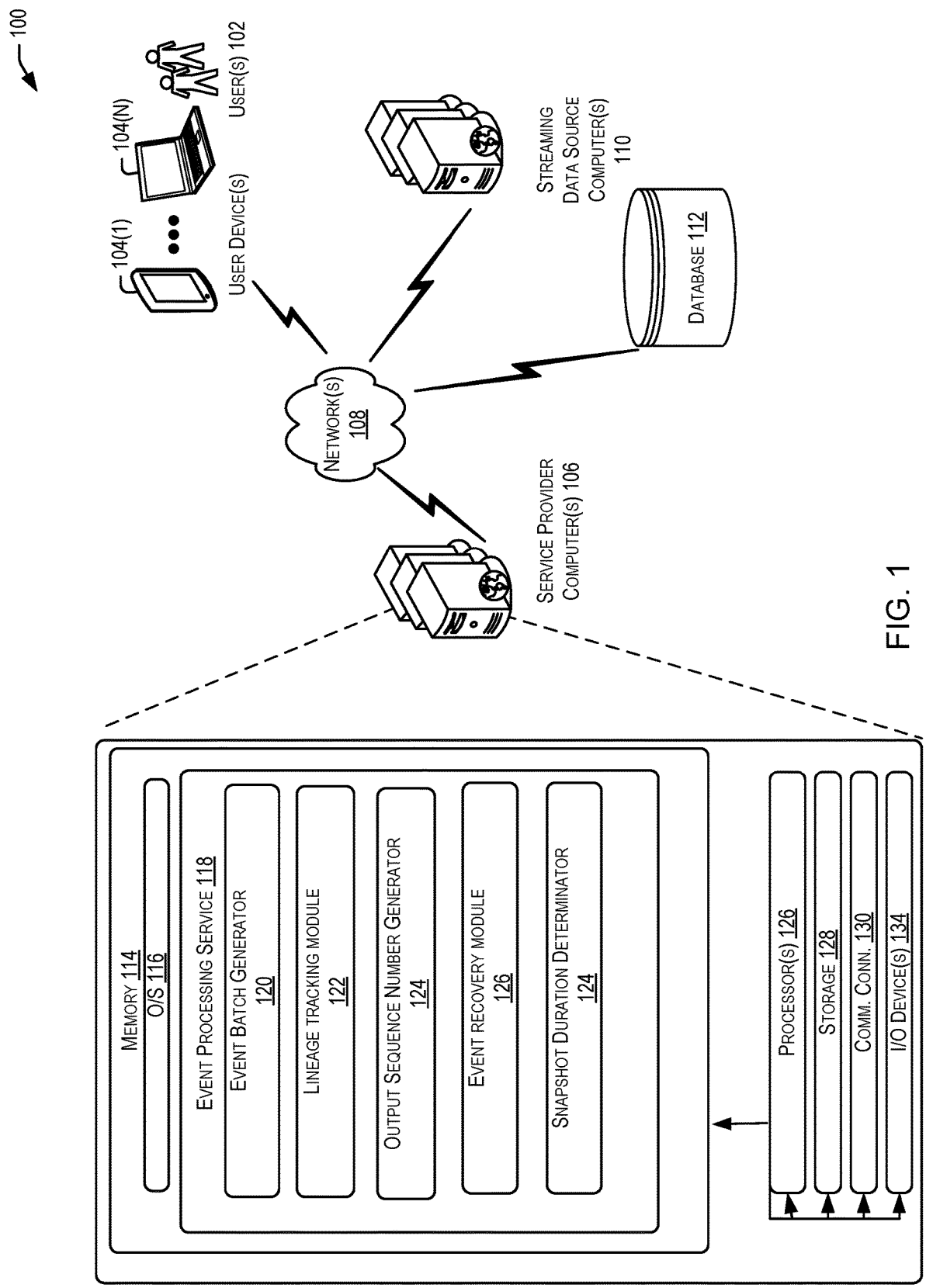
FIG. 1 depicts a simplified example system or architecture 100 in which techniques for performing distributed event processing may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefore expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQ Service and the CQ Service may also act as a logical database (DB) gateway for a CQL engine. In this way, the CQL engine may be able to leverage the BI analytics server for its analytics capabilities and semantic modeling.

In some examples, the CQ Service may provide, among other things, the following functionalities:
 Remoting service for BI Analytics Server as CQL engine Gateway;
 Event source/sink adapter;
 Generate data definition languages (DDLs) from logical SQL plus CQL extensions;
 Provide unified model for all types of continuous queries and implementation selections;
 Maintain metadata and support restartability; and
 High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring system may include a CQL engine to process and/or receive in-flight data. For example, a CQL engine may be an in-memory real-time event processing engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

The techniques described above and below may be implemented in a number of ways and in a number of contexts. Several example implementations and contexts are provided with reference to the following figures, as described below in more detail. However, the following implementations and contexts are but a few of many.

Illustrative Systems

FIG. 1 depicts a simplified example system or architecture 100 in which techniques for performing distributed event processing may be implemented. In architecture 100, one or more users 102 may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to event processing, described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 114 and one or more processing units (or processor(s)) 126. The processor(s) 126 may be implemented as appropriate in hardware, computer-executable instructions, firmware, or combinations thereof. Computer-executable instruction or firmware implementations of the processor(s) 126 may include computer-executable or machine-executable instructions written in any suitable programming language to perform the various functions described.

The memory 114 may store program instructions that are loadable and executable on the processor(s) 126, as well as data generated during the execution of these programs. Depending on the configuration and type of service provider computers 106, the memory 114 may be volatile (such as random access memory (RAM)) and/or non-volatile (such as read-only memory (ROM), flash memory, etc.). The service provider computers 106 or servers may also include additional storage 128, which may include removable storage and/or non-removable storage. The additional storage 128 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 114 may include multiple different types of memory, such as static random access memory (SRAM), dynamic random access memory (DRAM), or ROM.

The memory 114, the additional storage 128, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 114 and the additional storage 128 are all examples of computer storage media.

The service provider computers 106 may also contain communications connection(s) 130 that allow it to communicate with a stored database, another computing device or server, user terminals, and/or other devices on the networks 108. The service provider computers 106 may also include input/output (I/O) device(s) 134, such as a keyboard, a mouse, a pen, a voice input device, a touch input device, a display, one or more speakers, a printer, etc.

Turning to the contents of the memory 114 in more detail, the memory 114 may include an operating system 116 and one or more application programs or services for implementing the features disclosed herein. In an embodiment, the memory 114 may include an event processing service 118 configured to process input streams related to an application to generate an output stream of events related to the application. In an embodiment, the event processing service may include one or more modules such as an event batch generator 120, a lineage tracking module 122, an output sequence number generator 124, an event recovery module 126 and a snapshot duration determinator module 124 to implement the event processing services described herein. As used herein, modules may refer to programming modules executed by servers or clusters of servers that are part of a service. In this particular context, the modules may be executed by the servers or clusters of servers that are part of the service provider computers 106.

Figure 2:
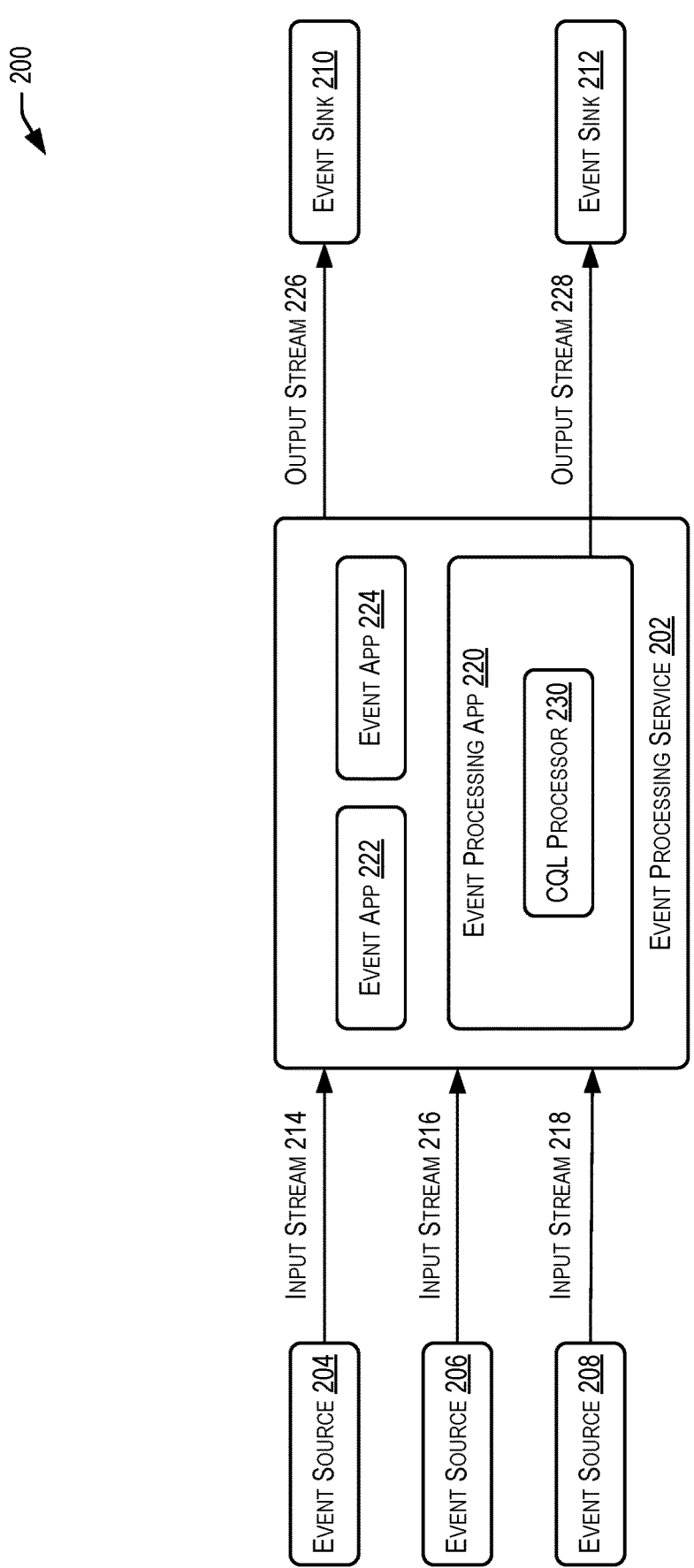
FIG. 2 depicts a simplified high level diagram of an event processing system 200 that may incorporate an embodiment of the present disclosure.

In some embodiments of the present disclosure, the service provider computers 106 may be implemented as an event processing system. FIG. 2 depicts a simplified high level diagram of an event processing system 200 that may incorporate an embodiment of the present disclosure. Event processing system 200 may comprise one or more event sources (204, 206, 208), an event processing service (EPS) 202 (also referred to as CQ Service 202) that is configured to provide an environment for processing event streams, and one or more event sinks (210, 212). The event sources generate event streams that are received by EPS 202. EPS 202 may receive one or more event streams from one or more event sources. For example, as shown in FIG. 2, EPS 202 receives a first input event stream 214 from event source 204, a second input event stream 216 from event source 206, and a third event stream 218 from event source 208. One or more event processing applications (220, 222, and 224) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (210, 212) in the form of one or more output event streams. For example, in FIG. 2, EPS 202 outputs a first output event stream 226 to event sink 210, and a second output event stream 228 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 220. As shown in FIG. 2, event processing application 220 is configured to listen to input event stream 218, execute a continuous query 230 comprising logic for selecting one or more notable events from input event stream 218, and output the selected notable events via output event stream 228 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 220 in FIG. 2 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 200 depicted in FIG. 2 may have other components than those depicted in FIG. 2.

Further, the embodiment shown in FIG. 2 is only one example of a system that may incorporate an embodiment of the present disclosure. In some other embodiments, system 200 may have more or fewer components than shown in FIG. 2, may combine two or more components, or may have a different configuration or arrangement of components. System 200 can be of various types including a service provider computer 106 described in FIG. 1, a personal computer, a portable device (e.g., a mobile telephone or device), a workstation, a network computer, a mainframe, a kiosk, a server, or any other data processing system. In some other embodiments, system 200 may be configured as a distributed system where one or more components of system 200 are distributed across one or more networks in the cloud.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Technique for Processing Events Using Event Batches in Continuous Query Processing As noted above, the use of CEP technology to build mission-critical applications has led to a need for CEP applications to be made highly available and fault-tolerant. Like any computing resource in computer systems, CEP systems can be subject to both hardware and software faults, which, if unaddressed can lead to data-or service-loss. High availability systems generally seek to mitigate both the likelihood and the impact of such faults through a combination of hardware, software, management, monitoring, policy, and planning.

As with any fault tolerant system, the details of what exactly happens at failover dictates the level of fidelity that can be provided to the system. Different failover mechanisms can result in different levels of accuracy depending on end-user requirements and constraints of cost, performance, and correctness. The most favorable level of fidelity is precise recovery in which downstream clients see exactly the same stream of events that would have been produced if no upstream failure had occurred and no missed events and duplicate events were allowed.

As noted above, the event processing system (e.g., 200) may be configured to execute queries in a continuous manner over potentially unbounded, real-time data streams. For example, the event processing system can receive one or more data streams, register a query against the data streams, and continuously execute the query as new data appears in the streams. Since this type of continuous query is long-running, the event processing system can provide a continuous stream of updated results to a client.

Since the event processing system typically receives a continuous stream of input events, the state of the event processing system is likely to change as rapidly as the incoming events arrive. Accordingly, preserving this system state reliably and accurately without losing system performance is desirable. Traditional approaches for preserving the state of the system typically involve replicating the behavior of the system, replicating the state of the system, or saving the stream of events that produced the state. While these approaches work well with a handful of resources (e.g., machines), they tend to result in inefficient resource utilization when a large number of resources are involved, since some of these resources may be idling or otherwise duplicating the processing of events.

In one embodiment of the present disclosure, the state of the event processing system may be preserved by processing the continuous input stream of events in one or more event batches. As used herein, an event batch may comprise a series of events of the continuous input event stream that are batched or grouped together over a period of time. In an embodiment, the event processing system may insert a checkpoint marker event into the continuous input event stream at pre-determined intervals of time to generate the event batches. Thus, in an embodiment, the event processing system may determine the size of an event batch and/or the interval of an event batch based at least in part on the checkpoint marker event. The checkpoint marker event may represent an event that includes information and/or metadata related to an event in the continuous event stream. In some examples, the checkpoint marker event may represent a heartbeat event. In other examples, the checkpoint marker event may represent an event of a special kind, such as a checkpoint marker, a regular event, a type of event such as a PLUS event, a MINUS event, a heartbeat event, and so on.

There are various ways in which the event processing system may determine the frequency and/or interval of time at which to introduce checkpoint marker events into the continuous input event stream to generate the event batches. In one example, the intervals of time at which to insert checkpoint marker events may be determined based on the type of streaming application and the frequency at which events are generated by the streaming application. For instance, the event processing system may determine for a financial application that streams events related to financial data, that a checkpoint marker be inserted into the event stream every 10 minutes, whereas for a sensor application that streams events related to network traffic, a checkpoint marker be inserted into the stream every five minutes. In other examples, the event processing system may determine the intervals of time based on the size of the events generated by the application, the latency requirement of the events generated by the application, and the like. In some examples, the event processing system may determine the intervals of time based on user information, sampling information, best practices used by an organization and the like.

In some embodiments, the event processing system may monitor the input event stream and calculate the estimated size of the system state using the query execution plan. For example, consider an event stream wherein the average number of input events is 1000/seconds, the average size of event is 1 k, and a query such as 'select price from stock[range 1 minutes]' is executed on the event stream. In this example, the query execution plan includes the query operators, RangeWindow, and Project and the estimated size of the system state can be computed as, 1000*60 (seconds) *1 k=60M at a moment of time because the system state is typically computed from the synopsis of the RangeWindow operator. This estimated size of the system state can be further averaged using a running average, and can be compared to the threshold value to determine when to insert a checkpoint marker in the event stream.

In certain embodiments of the present disclosure, the event processing system may be configured to process the checkpoint marker events. When a checkpoint marker event is completely processed, the event processing system may be configured to receive a checkpoint acknowledgement message that indicates that a set of events (i.e., an event batch) of the event stream comprising the checkpoint marker event have also been completely processed. The event processing system may then be configured to trigger the generation of a snapshot of the current state of the system.

As described herein, a snapshot may include information about a set of events (e.g., from an event batch) that have been processed by one or more operators of a continuous query over a time interval.

The processing of events in event batches as discussed above results in improved system performance since only the checkpoint marker event in each event batch is processed, rather than processing all the individual events in an event batch. In the event of system failure, only the events that have occurred after the checkpoint marker event need to be re-processed. Thus, upon recovery of the system, only the events that have occurred before the failure and after reconciling the state to the checkpoint marker event need to be re-processed and replayed. The manner in which the event processing system processes batches of events using checkpoint marker events is discussed in detail in relation to FIG. 3

Figure 3:
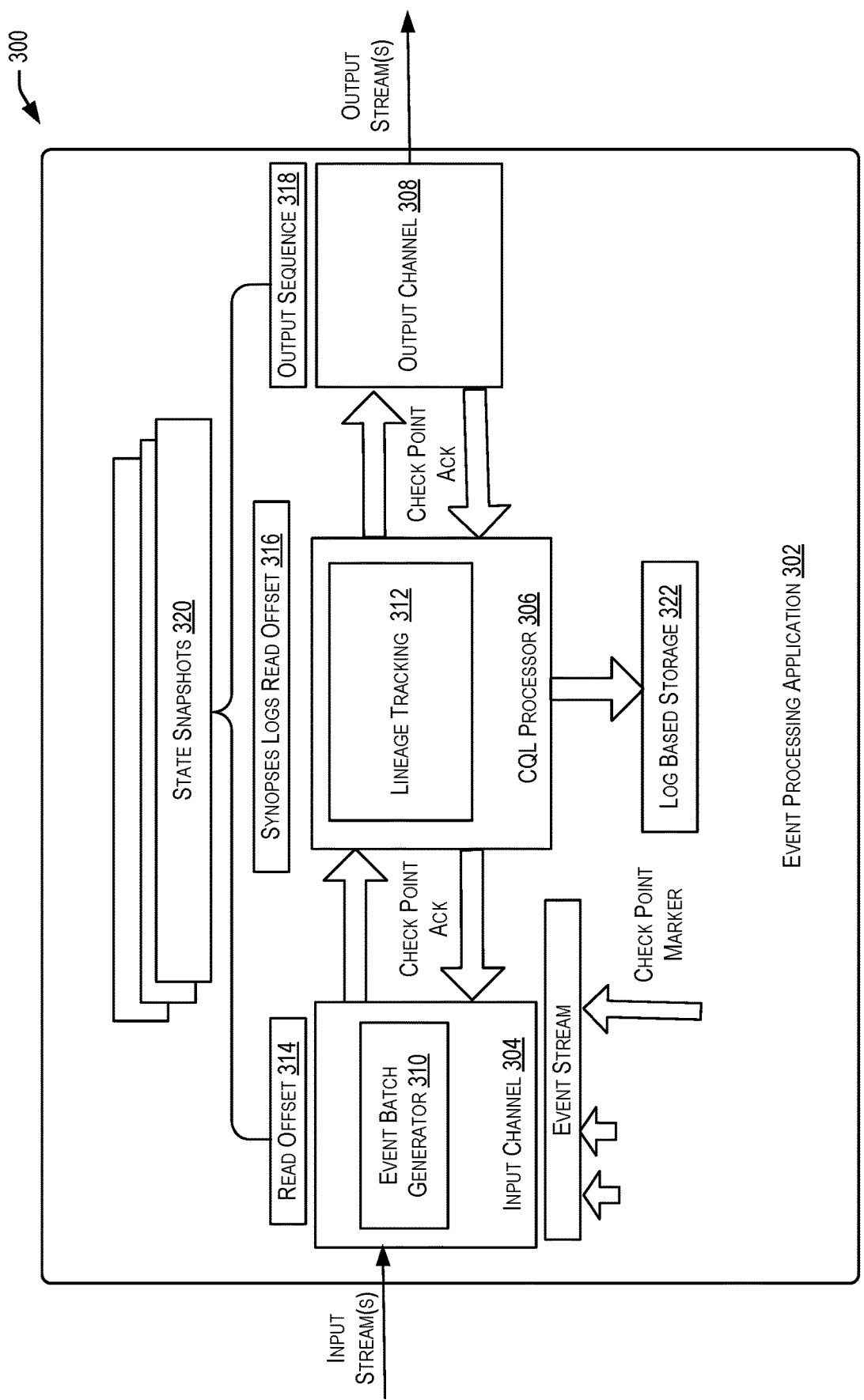
FIG. 3 is an exemplary illustration of an event processing system 300 including an event processing application 302 providing event processing services, in accordance with one embodiment of the present disclosure.

FIG. 3 is an exemplary illustration of an event processing system 300 including an event processing application 302 providing event processing services, in accordance with one embodiment of the present disclosure. In an embodiment, the event processing application 302 may be part of an event processing service (such as, 202 shown in FIG. 2) provided by the event processing system. In the embodiment depicted in FIG. 3, the event processing application 302 includes an input channel 304, a CQL processor 306 and an output channel 308. The event processing system 300 may have other components than those depicted in FIG. 3. The embodiment shown in FIG. 3 is one example of an event processing system that may incorporate an embodiment of the invention. In some other embodiments, the event processing system 300 may have more or fewer components than shown in FIG. 3, may combine two or more components, or may have a different configuration or arrangement of components.

The input channel 304 is configured to receive a continuous input stream of events related to an application and generate a set of one or more event batches from the continuous input stream of events. In an embodiment, the input channel 304 may include an event batch generator module 310. The event batch generator module 310 may be configured to generate event batches by introducing checkpoint marker events at pre-determined intervals of time into the continuous input event stream. As noted above, the pre-determined intervals of time at which the event batch generator module 310 may insert the checkpoint marker event into the event stream may be determined based on the type of streaming application producing the continuous stream of events. The pre-determined intervals may also be determined based on the frequency at which events are generated by the streaming application, the size of the events generated by the application, the latency requirement of the events generated by the application, user information, sampling information, best practices used by an organization, and the like. Further, and as noted above, the checkpoint marker event is a special event that may be represented by a heartbeat event or an event with a new event type.

The CQL processor 306 may be configured to process the set of events in an event batch. In an embodiment, the processing of events may include processing the checkpoint marker event in each event batch. In some embodiments, the CQL processor 308 may include a lineage tracking module 312. The lineage tracking module 312 may be configured to process the checkpoint marker events by performing lineage tracking of the checkpoint marker events. As described herein, lineage tracking refers to a technique for performing reliable data processing of events in an event stream by processing a directed graph of descendent events (lineage) of an input event. Processing the entire graph of events of an input event (e.g., a checkpoint event) ensures reliable data processing and the ability to restart processing in case of failures.

In an embodiment, a lineage tracking algorithm can be applied to the checkpoint marker events. In an example, the checkpoint marker events may refer to identifiers of the oldest events on each input stream that still contribute to the state up to the time before a snapshot of the current state of the system is generated. The checkpoint marker events may be injected to the input stream similar to heartbeat events. Checkpoint marker events may be similar to pass-through events by which each operator can transmit the checkpoint marker event to its child operators. In an embodiment, the lineage tracking of the checkpoint marker events may be performed using a technique used by the Storm open source stream processing system provided by Twitter® Corporation. An exemplary implementation of the technique used by Storm uses XOR operations of event identifiers and can be described as follows:

All events that are emitted by the sources are marked by a random identifier (ID). For each source, the framework maintains a set of pairs (event ID, signature) for each initial event. The signature is initially initialized by the event ID.

Downstream nodes can generate zero or more events based on the received events. Each event carries its own random ID and the ID of the initial event.

If the event is successfully received and processed by the next node in the graph, this node updates the signature of the corresponding initial event by XORing the signature with (a) an ID of the incoming event and (b) IDs of all events produced based on the incoming event.

An event can be produced based on more than one incoming event.

The event is considered to be successfully processed as soon as its signature turns into zero, i.e., the final node is acknowledged that the last event in the graph was processed successfully.

Upon detecting that the checkpoint marker event has been completely processed by the lineage tracking module 312, the lineage tracking module 312 generates a checkpoint end marker event. Upon receiving the checkpoint end marker event, the output channel 308 transmits a checkpoint acknowledgement message to the input channel 304. This triggers the generation of a snapshot 320 of the current state of the system. In an embodiment, the snapshot 320 of the current state of the system comprises information related to at least one of an input queue state, an operator state, or an output queue state related to a processed batch of events in the event stream. As described herein, the input queue state refers to the state of input channel. In one embodiment, and as will be discussed in detail below, the input channel may use a storage mechanism (e.g., Kafka provided by Apache® Corporation) and the state of the input channel may comprise a read offset from a data storage system (e.g., Kafka storage). In some examples the read offset may indicate the current position of a storage container with which the input events are associated (e.g., a Kafka topic). The output queue state refers to the state of the output channel. In one embodiment, the state of the output channel may include an output sequence number when output trimming is used. Additional details related to output sequence numbers and output trimming are described below. The operator synopsis refers to a state of the operator objects identified in the query plan of a continuous query that processes the events in the event stream. In one embodiment, the operator synopsis may refer to a mutable state of the operator for processing events, such as the last timestamp of the event, and the actual synopsis that includes the summary of events for processing the events, such as a list of events for a specified window size for the window operator or an aggregated result for the GroupAggr operator.

In some examples, information related to the current state of the system may be stored in the form of synopsis logs in a cluster of machines in a log based storage system 322. In one embodiment, the cluster of machines may be implemented as a Kafka cluster provided by Apache® Corporation. As used herein, Kafka refers to a distributed, partitioned replicated data storage mechanism that enables the storage of information from data streams that are partitioned over a cluster of machines. Kafka provides a user-centric design that offers strong durability and fault-tolerance guarantees since it enables the partitioning of data streams over a cluster of machines to allow data streams larger than the capability of any single machine to be processed.

In some embodiments, the current state 320 of the system may include information related to an input queue state (which may include a read offset 314), an operator synopsis (which may include a synopsis logs read offset 316), and an output queue state (which may include an output sequence 318). In some examples, the read offset 314 may include a current position of a storage container that stores the input events (e.g., Kafka topic). The synopsis logs read offset 316 may include, for example, the position of the synopsis log written to the storage container (e.g., Kafka topic). The output sequence 318 may include information related to an output sequence number of an event processed by the event processing system.

In some embodiments, the log based storage 322 may be configured to store information related to the current state of the system as synopsis change logs that are continuously stored to a container (e.g., Kafka topic) in a background thread (e.g. asynchronously). In some examples, the log based storage 322 may create an in-memory snapshot of synopsis to store the state of the operators. Each operator uses different type of data structures for storage and some of them may generate a relatively large memory dump. In order not to introduce additional performance penalty from creating a snapshot, in one example, a continuous/asynchronous log based state storage for certain operators may be used. Thus, in some embodiments, the log based storage 322 may represent a continuous and/or asynchronous log based state storage for certain operators of the continuous query. With this approach, all synopsis operations (such as, for example, insert, update, and delete operations) may be captured as log operations. The state can be seen as append-only logs. Using a separate thread with the internal publish/subscribe queue, this operation can be performed asynchronously and the delay where all operators should stop processing events may be minimized.

To reconcile and/or reconstruct the state from log based storage 322, the logs have to be replayed from the start to the desired point. Such an approach may not be desirable for fast recovery. In order to provide more efficient recovery, in one embodiment of the present disclosure, the logs may include full snapshots in a pre-determined duration and separate synopsis snapshots may be generated to reconcile the state from log based storage. In other embodiments, the synopsis for a range window operator may be reconstructed by replaying the events since essentially the synopsis of the range window operator requires the same set of events as the input events after reconstructing a full snapshot. This approach may also reduce the amount of information stored in the synopsis logs.

As noted above, processing only the checkpoint marker event in each event batch rather than processing all the individual events of an event batch results in increased system performance. In the event of failure, only the events that have occurred after the checkpoint marker event need to be re-processed. Thus, upon recovery, only the input events that have occurred before the failure and after reconciling the state to the checkpoint are re-processed and replayed.

In some embodiments, upon recovery, the state of the system rewinds to the checkpoint marker event before the failure. In one example, the reader offset is rewound to the location stored in the snapshot and the reader offsets are used to read the same set of input events for the snapshot before the failure.

Since the events that occurred before the failure and after reconciling the state to the checkpoint are re-processed, the above technique can potentially result in the generation of duplicate output events for the events that are re-processed from the last checkpoint marker event (in the most recently processed event batch), to the failure point. It is desirable, however, to achieve precise recovery of events in which downstream clients see exactly the same stream of events that would have been produced if no upstream failure had occurred and no missed events and duplicate events were allowed.

One technique of providing precise recovery is to use output queue trimming. As described herein, 'output queue trimming' refers to proactively discarding queued events by the system when the system determines that the events are no longer needed for recovery. Using such a configuration, an active primary server communicates to one or more secondary servers, the events that it has actually processed. This enables the secondary servers to "trim" their buffer of output events so that it contains only those events that have not been sent by the primary server at a particular point in time. This allows the secondary server to avoid missing any output events when there is a failover, since events are only trimmed after they have been sent by the current primary server.

The frequency with which the active primary server sends queue trimming messages to active secondary servers may be configurable. For instance, queue trimming messages can be sent on an event basis, for example, every n events (0<n), which limits the number of duplicate output events to at most n events at failover or on a timed basis, every n milliseconds (0<n). The queue trimming adapter requires a way to identify events consistently among the active primary and secondaries.

In such configuration, the secondary servers are setup to listen over the adapter to the event stream being published by the primary server. By configuring the adapter for reliable delivery, the stream of events seen by the secondary server is precisely the stream of events output by the primary server and thus failover will allow the new primary server to output precisely those events not delivered by the old primary server. The advantage of queue trimming is that output events are never lost. However, there is a performance overhead at the active primary server for sending the trimming messages that need to be communicated and this overhead increases as the fidelity of trimming increases.

Technique for Processing Events Using Event Batches and Output Sequencing in Continuous Query Processing In one embodiment of the present disclosure, the precise recovery of events may be achieved through the use of output sequencing along with checkpoint marking. In this embodiment, a counter may be used for the deterministic output events generated by the event processing system. Each output event transmitted by the event processing system is associated with an output sequence number. When a snapshot of the current state of the system is generated, the current output sequence number is stored as part of the snapshot. In some examples, the stored output sequence number represents the 'last output sequence number' for the snapshot. For instance, in one example, the output sequence number may be stored as part of the output sequence (318) in the output state queue as shown in FIG. 3. In some examples, the current output sequence number is made available to the system even after failure. The current output sequence number can be persisted to a storage when the sequence number changes. The current output sequence can also be stored in a distributed hash table so that the system can retrieve it from another machine in case of system failure, in some embodiments.

In one embodiment, the event processing system may achieve the precise recovery of events after a system failure as follows. The event processing system identifies the 'current output sequence number' of the most recently transmitted output event and the 'last output sequence number' stored in the snapshot corresponding to the most recently processed batch of events (i.e., from the most recently processed checkpoint marker event). The event processing system then sets the state of output channel to 'RECONCILE' and begins re-processing the events that occurred after the most recently processed checkpoint marker event, prior to the system failure. However, the re-processing of these events may result in the re-generation of one or more output events that have already been successfully transmitted by the system. In order to avoid the re-transmission of these output events, in one embodiment, the event processing system compares the next output sequence number of a re-processed event to the current output sequence number. If the next output sequence number of the re-processed event is less than the current output sequence number, the event is ignored and not re-output. When the next output sequence number of the re-processed event becomes equal to or greater than the current sequence number, the event processing system changes the state of the output channel to 'NORMAL' and begins transmitting the output events from the current sequence number corresponding to the most recently transmitted output event.

Figure 4:
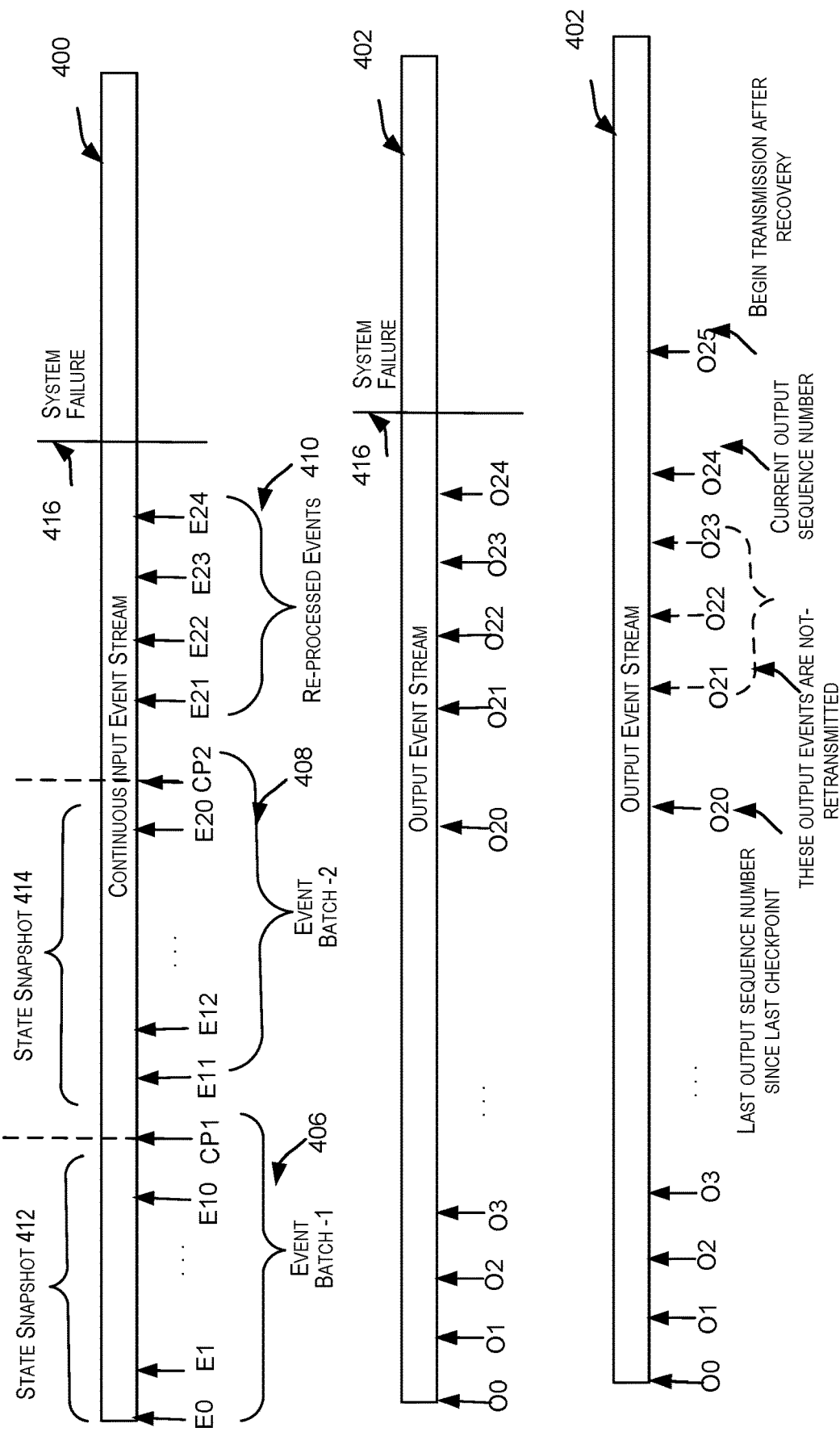
FIG. 4 is an exemplary illustration of the manner in which an event processing system can perform the precise recovery of events, in accordance with an embodiment of the present disclosure.

FIG. 4 is an exemplary illustration of the manner in which an event processing system can perform the precise recovery of events, in accordance with an embodiment of the present disclosure. In the embodiment depicted in FIG. 4, reference numeral 400 represents a continuous input event stream received from an event processing system (e.g., 300). Reference numerals 406, 408 represent event batches generated by the event processing system by inserting checkpoint marker events, CP1, CP2 at pre-determined intervals of time into the continuous input event stream. As noted above, checkpoint marker events, (e.g., CP1, CP2) may be processed by performing lineage tracking of the checkpoint marker events. When a checkpoint marker event (e.g., CP1 or CP2) is completely processed, the event processing system receives a checkpoint acknowledgement message indicating that an event batch (e.g., 406 or 408) of the event stream comprising the checkpoint marker event (CP1 or CP2) has been completely processed. The event processing system then triggers the generation of a snapshot (412, 414) of the current state of the system.

Reference numeral 402 represents an output stream comprising a set of one or more output events generated by the event processing system as a result of processing the continuous input event stream, 400. In an embodiment, each output event may be identified as Oi, where i is an integer indicating the output sequence number assigned to the output event in the order of generation of the output event by the event processing system. Thus, an output event may be identified as O1, where 1 is the sequence number assigned to the output event. Each input event in the continuous input event stream, 400 may be identified as Ej, where j is represents a unique identifier for the input event. For instance, an input event may be identified as E1, where 1 is the unique identifier for the input event. In the embodiment depicted in FIG. 5, the processing of a single input event E1 is assumed to result in the generation of a corresponding single output event O1. However, it is to be appreciated that in some other embodiments, an output event O1 may be generated as a result of processing of a plurality of input events. For instance, an output event O1 may be generated as a result of processing input events, E1, E2, and E3, in one example.

When a system failure is detected by the event processing system at 416, the event processing system identifies the events that have occurred prior to the failure since the last checkpoint marker event (CP2) of the most recently processed batch of events (e.g., 408) and re-processes these events. However, the re-processing of these events (e.g., E21, E22, E23 and E24) may result in the generation of a duplicate set of one or more output events, O21, O22, O23 and O24 since these output events have already been transmitted to the output stream 402. In order to prevent the generation of a duplicate set of output events, in one embodiment, the event processing system identifies the last output sequence number O20 of the output event since the last checkpoint marker event and the current output sequence number O24 of the most recently transmitted output event. The event processing system then ignores any output events (e.g., O21, O22 and O23) that can be generated between the last output sequence number, O20 and the current output sequence number O24 due to the re-processing of corresponding input events (E21, E22 and E23).

As noted above, in one embodiment, the event processing system compares the next output sequence number (e.g., O21) of a corresponding re-processed event (e.g., E21) from the last checkpoint marker event, to the current output sequence number (e.g., O24). If the next output sequence number (e.g., O21) is less than the current sequence number (e.g., O24), the event is ignored and not re-output. When the next output sequence number of a re-processed event becomes equal to or greater than the current output sequence number (e.g., O24), the event processing system changes the state of the output channel to 'NORMAL' and begins re-transmitting output events (e.g., O25) from the current output sequence number of the most recently transmitted output event (e.g., O24) in the output stream of events. Thus, by not including one or more output events in the set of one or more output events to be re-transmitted, the event processing system prevents the transmission of duplicate events while achieving the precise recovery of events.

Figure 5:
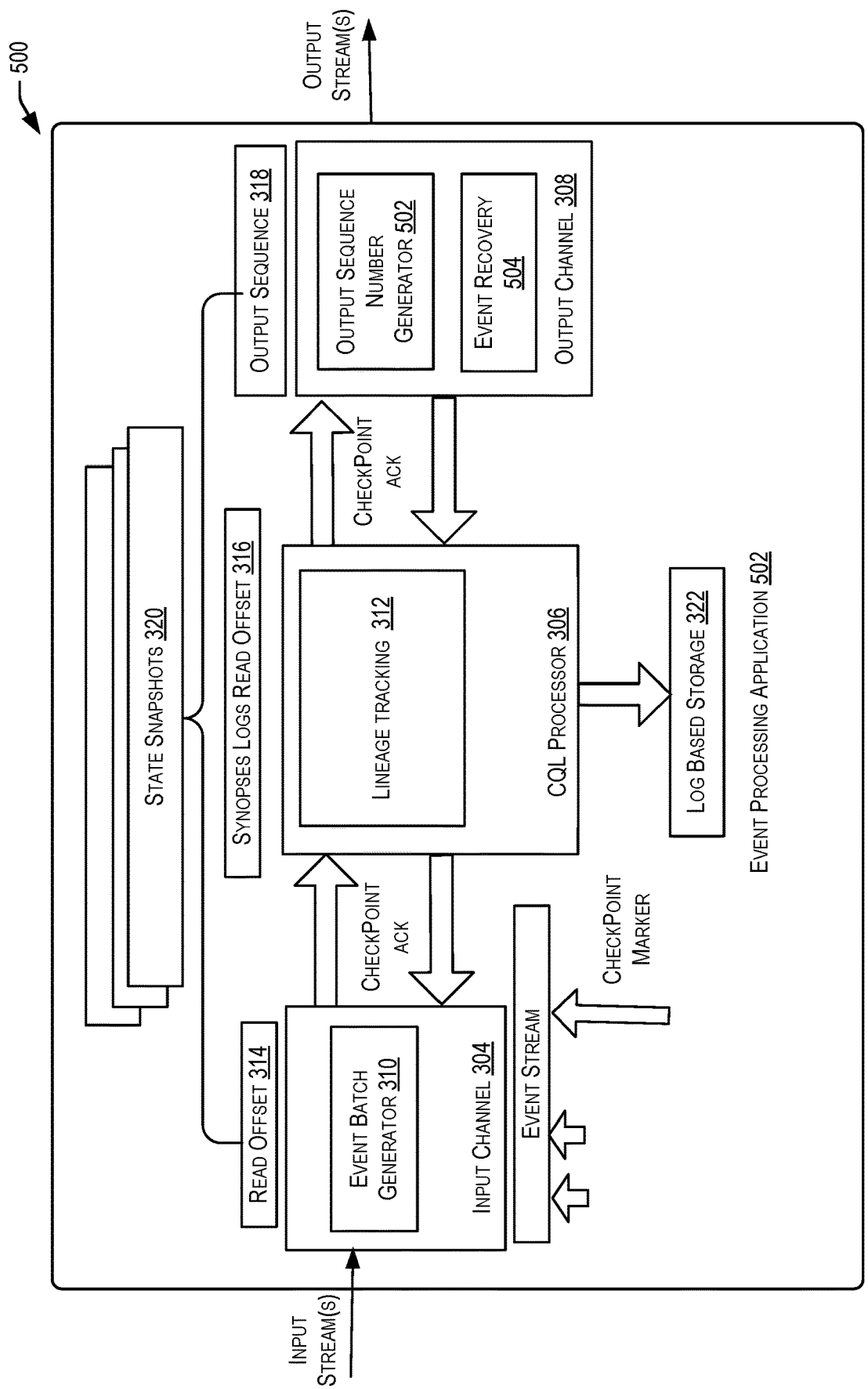
FIG. 5 is an exemplary illustration of an event processing system 500 including an event processing application 502 providing event processing services, in accordance with one embodiment of the present disclosure.

FIG. 5 is an exemplary illustration of an event processing system 500 including an event processing application 502 providing event processing services, in accordance with one embodiment of the present disclosure. In an embodiment, the event processing application 502 may be similar to or the same as the event processing system (e.g., 302) shown in FIG. 3 and may include components such as an input channel 304, a CQL processor 306 and an output channel 308 as shown in FIG. 3. The embodiment shown in FIG. 5 is one example of an event processing system that may incorporate an embodiment of the invention. In some other embodiments, the event processing system 500 may have more or fewer components than shown in FIG. 5, may combine two or more components, or may have a different configuration or arrangement of components.

As noted above in relation to FIG. 3, the input channel 304 is configured to receive a continuous input stream of events related to an application and generate a set of one or more event batches from the continuous input stream of events. In an embodiment, the event batch determinator module 310 in the input channel 304 may be configured to generate the event batches by introducing checkpoint marker events at pre-determined intervals of time into the continuous input event stream.

The CQL processor 306 may be configured to process the set of events in an event batch. As noted above, the processing of events may include processing the checkpoint marker event in each event batch. Upon detecting that the checkpoint marker event has been completely processed by the lineage tracking module 312, the lineage tracking module 312 generates a checkpoint end marker event. Upon receiving the checkpoint end marker event, the output channel 308 transmits a checkpoint acknowledgement message to the input channel 304. This triggers the generation of a snapshot 320 of the current state of the system. In an embodiment, the snapshot 320 of the current state of the system may be stored in the form of log based storage 322 (synopsis logs) to a cluster of machines.

In accordance with some embodiments, the output channel 308 may include an output sequence number generator 502 and an event recovery module 504. The output sequence number generator 502 may be configured to generate an output sequence number for each output event generated by the event processing system. The event recovery module 504 may be configured to perform the precise recovery of events in the event processing system. When a system failure is detected, the event recovery module 504 identifies the 'current output sequence number' of the most recently transmitted output event and the 'last output sequence number' stored in the snapshot corresponding to the most recently processed batch of events (i.e., from the most recently processed checkpoint marker event). The event recovery module 504 then sets the state of output channel to 'RECONCILE' and begins re-processing the events that occurred after the most recently processed checkpoint marker event, prior to the system failure. However, as noted above, the re-processing of these events may result in the re-generation of one or more output events that have already been successfully transmitted by the system. In order to avoid the re-transmission of these output events, in one embodiment, the event recovery module 504 compares the output sequence number of a re-processed event to the current output sequence number. If the output sequence number of the re-processed event is less than the current output sequence number of the most recently transmitted output event, the event is ignored and not re-transmitted. When the output sequence number of the re-processed event becomes equal to or greater than the current sequence number of the most recently transmitted output event, the event processing system changes the state of the output channel to 'NORMAL' and begins transmitting the output events from the current sequence number corresponding to the most recently transmitted output event.

Illustrative Processes

Figure 6:
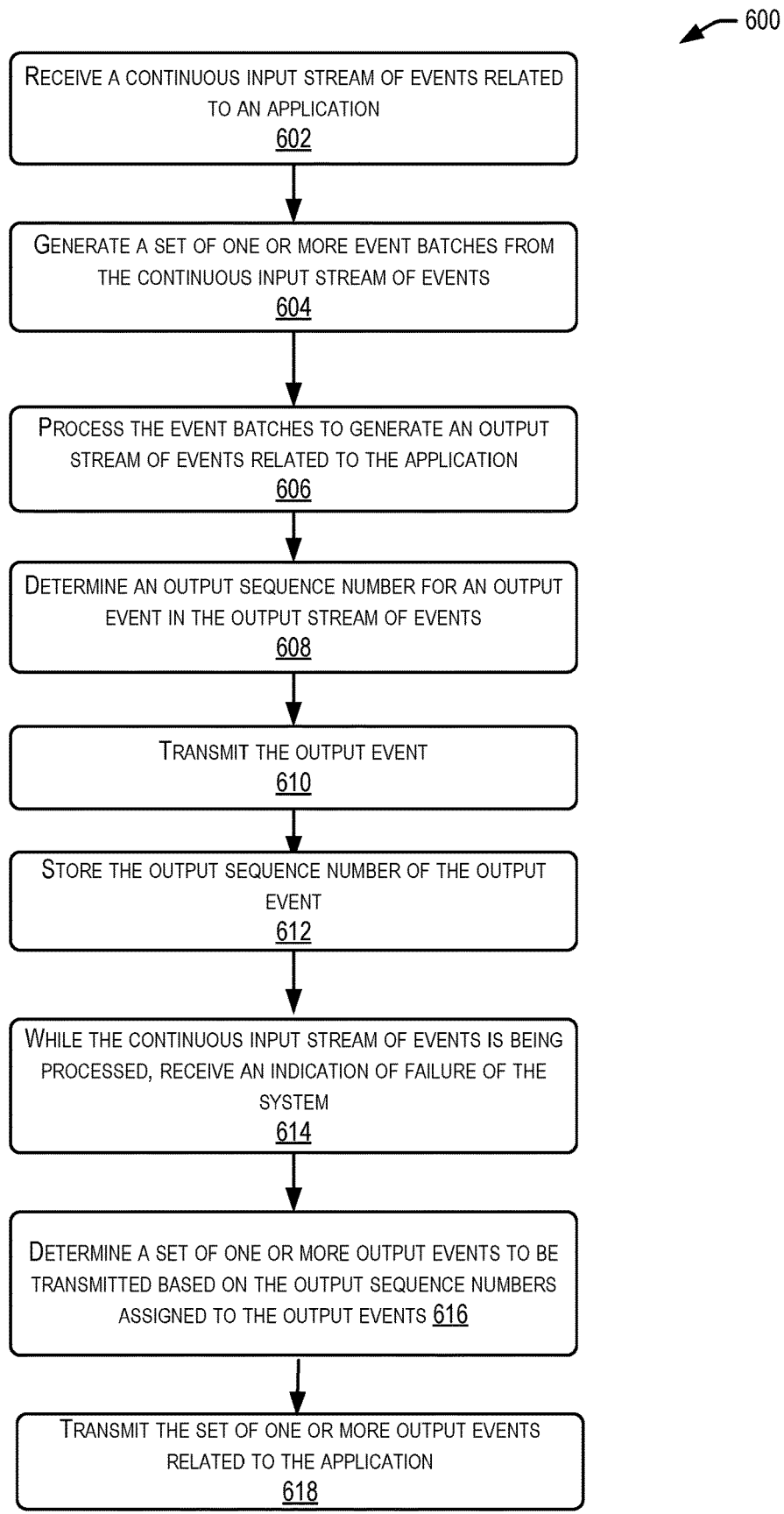
FIG. 6 illustrates a flow diagram of an example process 600 for providing event processing services in accordance with one embodiment of the present disclosure.
Figure 7:
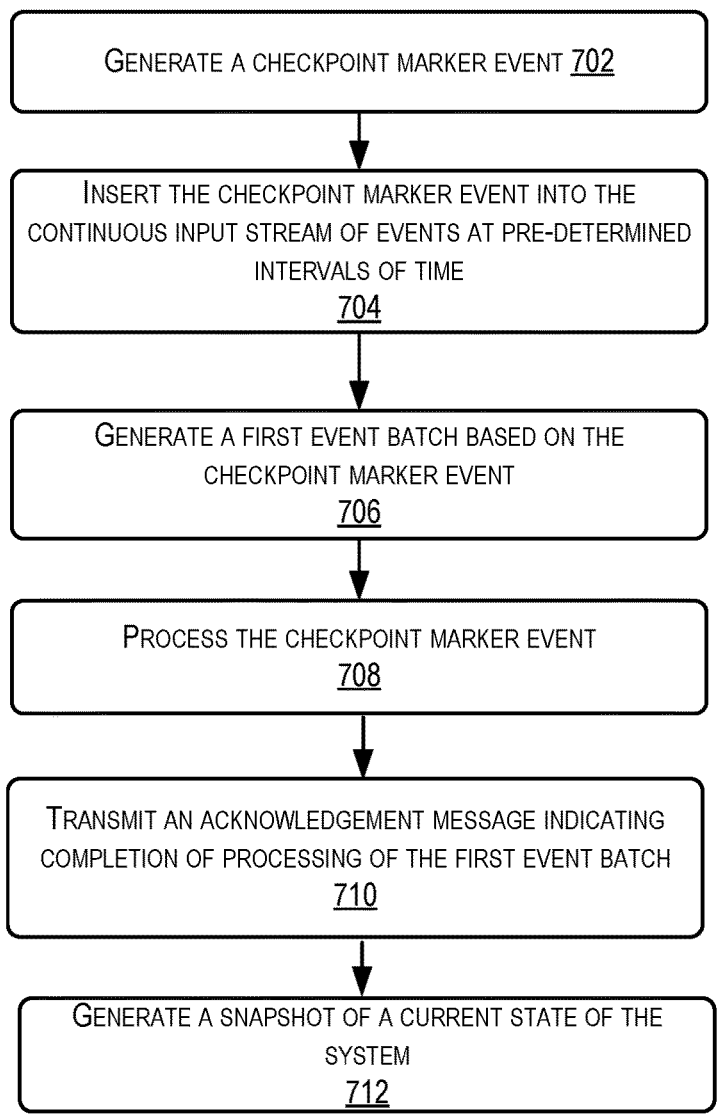
FIG. 7 illustrates a flow diagram of an example process 700 for processing events in a continuous stream of events, in accordance with one embodiment of the present disclosure.
Figure 8:
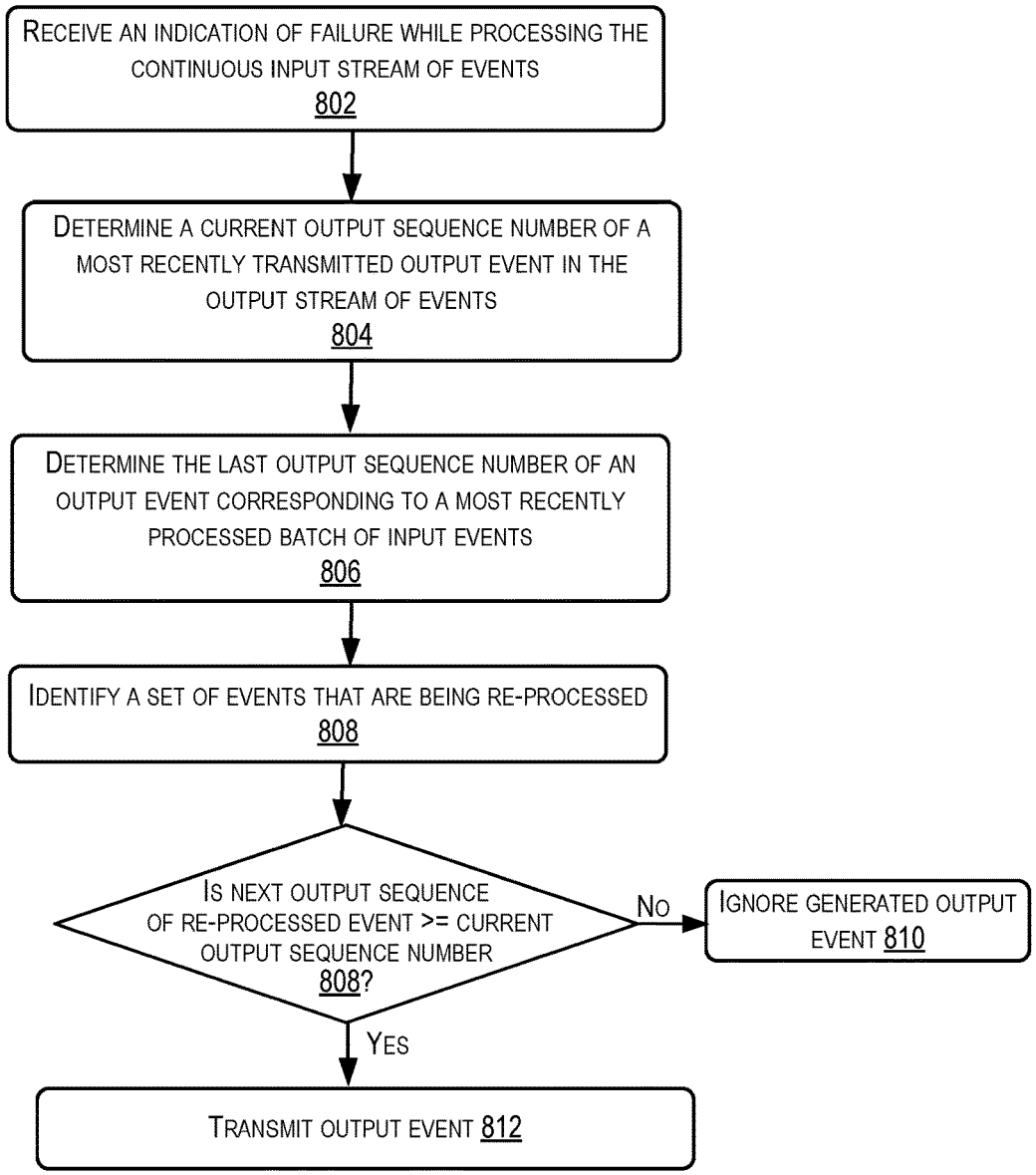
FIG. 8 illustrates a flow diagram of an example process 800 for determining a set of one or more output events to be transmitted in an output stream, in accordance with one embodiment of the present disclosure.

FIGS. 6-8 illustrate example flow diagrams showing respective processes 600, 700 and 800 of providing event processing services according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the event processing system (e.g., utilizing at least the input channel 304, the event batch determinator 310, the lineage tracking module 312, the output sequence number generator 502 and the event recovery module 504) shown in at least FIG. 2, FIG. 3, FIG. 5 (and others) may perform the processes 600, 700 and 800 of FIGS. 6-8 respectively.

FIG. 6 illustrates a flow diagram of an example process 600 for providing event processing services in accordance with one embodiment of the present disclosure. The process at 600 may begin at 602 when a continuous input stream of events related to an application is received by the event processing system. For instance, the event processing system may receive a continuous input stream of events from one or more event sources (204, 206 or 208) as shown in FIG. 2. Upon receiving the continuous input stream of events, at 604, the event processing system generates a set of one or more event batches from the continuous input stream of events. As noted above, in one embodiment, the event processing system may generate the event batches by introducing checkpoint marker events at pre-determined intervals of time into the continuous input event stream.

At 606, the event processing system processes the events in the event batches to generate an output stream of events related to the application. The manner in which the event processing system processes events in an event batch is discussed in additional detail in relation to FIG. 7.

At 608, the event processing system determines an output sequence number for an output event in the output stream of events. As noted above, the output sequence number corresponds to a sequence number assigned to an output event in the order of generation of the output event by the event processing system. At 610, the event processing system transmits the output event. At 612, the event processing system stores the output sequence number of the output event. For instance, as noted above, in one embodiment, the output sequence number may be stored as part of the output sequence information (318) in the output state queue as shown in FIG. 3.

In some embodiments, at 614, the event processing system may receive an indication of failure of the system while processing the continuous input stream of events. At 616, the event processing system determines a set of one or more output events of the output stream to be transmitted based at least in part on the output sequence numbers assigned to the output events. Additional details regarding the manner in which the event processing system may determine a set of one or more output events to be transmitted is discussed in relation to FIG. 8. At 618, the event processing system transmits the set of one or more output events related to the application.

FIG. 7 illustrates a flow diagram of an example process 700 for processing events in a continuous stream of events, in accordance with one embodiment of the present disclosure. Process 700 provides additional details of performing process 606 of FIG. 6. In an embodiment, this process may be performed by the event batch determinator 310 and the lineage tracking module 312 in the event processing system.

In some embodiments, process 700 begins at 702 when the event processing system generates a checkpoint marker event. As noted above, the checkpoint marker event may represent an event that includes information and/or metadata related to an event in the continuous input stream of events. In some examples, the checkpoint marker event may also represent a heartbeat event.

At 704, the event processing system inserts the checkpoint marker event into the continuous input stream of events at pre-determined intervals of time. As noted above, the pre-determined intervals of time may be determined based on the type of streaming application, the frequency at which events are generated by the streaming application, the size of the events generated by the application, the latency requirement of the events generated by the application, user information, sampling information, best practices, and the like.

At 706, the event processing system generates a first event batch based at least in part on the checkpoint marker event. Thus, in an embodiment, the size and/or interval of an event batch in the event stream may be determined based at least in part on the point (or time) at which the checkpoint marker event is inserted into the event stream In some examples, at 708, the event processing system processes the checkpoint marker event. As noted above, processing the checkpoint marker event may involve performing lineage tracking of the checkpoint marker event. Upon successful processing of the checkpoint marker event, in some examples, at 710, the event processing system may transmit an acknowledgement message indicating completion of the processing of the first event batch that comprises the checkpoint marker event. At 712, the event processing system generates a snapshot of the current state of the system. In some examples, the snapshot of the current state of the system comprises information related to at least one of an input queue state, an operator state, or an output queue state related to at least the first batch of events in the event stream.

FIG. 8 illustrates a flow diagram of an example process 800 for determining a set of one or more output events to be transmitted in an output stream, in accordance with one embodiment of the present disclosure. Process 800 provides additional details of performing process 616 of FIG. 6. In an embodiment, this process may be performed by the output sequence number generator 502 and the event recovery module 504 in the event processing system.

In some embodiments, process 800 may begin at 802 when the event processing system receives an indication of failure while processing the continuous input stream of events. At 804, the event processing system determines a current sequence number of a most recently transmitted output event in the output stream of events. At 806, the event processing system determines the last output sequence number of an output event corresponding to a most recently processed batch of events.

In some examples, at 808, the event processing system identifies a set of one or more events that are being re-processed as a result of system failure. At 810, the event processing system determines if the next output sequence number of a re-processed event (after the last sequence number of the output event corresponding to a most recently processed batch of events) is greater than or equal to the current output sequence number of the most recently transmitted output event in the output stream of events. If the event processing system determines that the next output sequence number of a re-processed event is not greater than or equal to the current output sequence number of the most recently transmitted output event in the output stream of events, the event processing system ignores the generated output event and does not re-transmit it, thus preventing the duplicate transmission of the output event. Once, the next output sequence number of a re-processed event becomes equal to or greater than the current output sequence number of the most recently transmitted output event in the output stream of events, then at 812, the event processing system begins transmitting the output events once again.

Technique for Performing Log Based Fast State Recovery for Failover in Continuous Event Processing As events continually arrive to an event processing system, preserving the state of the system reliably and accurately without losing system performance is desirable. In one embodiment of the present disclosure, the state of the event processing system can be preserved by creating snapshots of the current state of the system. As noted above, a snapshot may include information about a set of events (e.g., from an event batch) that have been processed by a continuous query, over a time interval. For instance, the snapshot may include information regarding an input queue state, an operator state, or an output queue state related to events in an event stream. The operator state typically includes information regarding the state of the operators identified in the continuous query that processes the events of the event stream. Since each operator uses a different type of data structure (i.e., synopsis) for storage, a snapshot that is generated using these operators can get converted into a relatively large memory dump. This can potentially result in a relatively large byte array that needs to be written to log based storage (e.g., 322) every time a snapshot is generated.

In one embodiment of the present disclosure, instead of generating a 'full snapshot' of the current state of the system, the event processing system may be configured to generate a 'journaled snapshot' of the current state of the system. As described herein, a 'journaled snapshot' refers to a snapshot of the current state of the system that is generated incrementally based on a log of operations performed on the operator synopsis. For example, the log of operations may include insert and delete operations on a list data structure used in a 'Range Window' operator. 'Journaled operators' refer to operators that support the creation of a 'journaled snapshot.' Examples of 'journaled operators' may include, for example, windows operators, groupBy operators, and the like. The generation of 'journaled snapshots' corresponding to the execution of the 'journaled operators' of a continuous query results in a reduced byte array that is written into log based storage each time a set of events (e.g., in an event batch) are processed.

A 'full snapshot,' for purposes of this disclosure, refers to a snapshot of the current state of the system that is generated based on the execution of one or more operators including 'journaled operators' and 'non-journaled operators' of the continuous query on a set of events of the event stream. As used herein, 'non-journaled operators' refer to operators that do not support the generation of a 'journaled snapshot.' Examples of non-journaled operators may include, for instance, median operators, min operators, max operators, and the like. Non-journaled operators typically dump the current state as the full snapshot because, in certain situations, creating a journaled snapshot may be more expensive than creating a full snapshot.

In some embodiments of the present disclosure, when the event processing system determines that a snapshot of the current state of the system is required to be generated (for e.g., once a set of events in an event batch have been processed), the event processing system makes a determination of whether a 'journaled snapshot' or a 'full snapshot' of the current state of the system is to be generated for the processed events in the event batch. For instance, in one embodiment, the event processing system may generate a 'full snapshot' of the current state of the system for all the events in a first batch of processed events. For batches of events that are subsequently processed, the event processing system may generate a combination of 'journaled snapshots' and 'full snapshots' as follows. For instance, in one embodiment, the event processing system may generate 'journaled snapshots' of the current state of the system that correspond to the execution of the 'journaled operators' on a set of events of an event batch and 'full snapshots' of the current state of the system that correspond to the execution of all operators including 'journaled operators' and 'non-journaled' operators on the set of events of the event batch.

The generation of 'journaled snapshots' corresponding to the execution of the 'journaled operators' of a continuous query as discussed above results in a reduced byte array that is written into log based storage each time a set of events (e.g., in an event batch) are processed. This is because 'journaled operators' are required to record the operation performed to the operator synopsis. For instance, consider a continuous query that has a RangeWindow operator with '[range 1 mins]'. The 'state' of the 'journaled operator' performing the processing in this case, is 'insert' when an event is in the range of the window, and 'delete' when an event is out of the range of the window and should be deleted from the synopsis. In other words, the 'state' of the Range Window operator records all operations performed to the synopsis that have been performed so far in the batch. Thus, by generating a 'journaled snapshot' corresponding to those operators of the continuous query that are identified as 'journaled operators,' the byte array that needs to be written to the log based storage can be significantly reduced. A 'full snapshot' on the other hand would typically require a full synopsis to be dumped to memory. The manner in which the event processing system generates snapshots of the current state of the system is discussed in detail in relation to FIG. 9.

Figure 9:
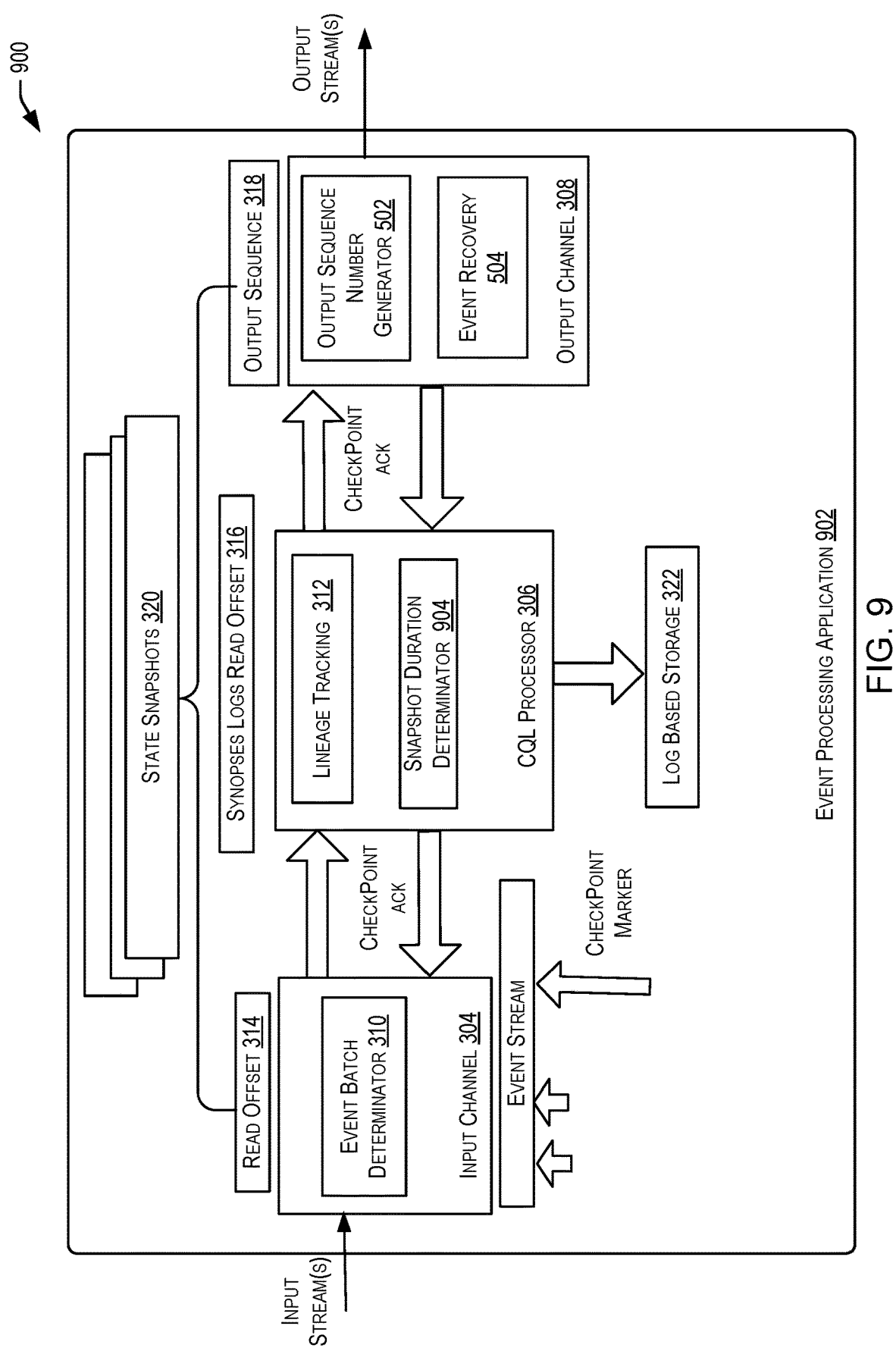
FIG. 9 is an exemplary illustration of an event processing system 900 including an event processing application 902 providing event processing services, in accordance with one embodiment of the present disclosure.

FIG. 9 is an exemplary illustration of an event processing system 900 including an event processing application 902 providing event processing services, in accordance with one embodiment of the present disclosure. In an embodiment, the event processing application 902 may be part of an event processing service (such as, 202 shown in FIG. 2) provided by the event processing system. In an embodiment, the event processing application 902 may be similar to or the same as the event processing system (e.g., 302 or 502) shown in FIG. 3 or 5 respectively and may include components such as an input channel 304, a CQL processor 306 and an output channel 308. The embodiment shown in FIG. 9 is one example of an event processing system that may incorporate an embodiment of the invention. In some other embodiments, the event processing system 900 may have more or fewer components than shown in FIG. 9, may combine two or more components, or may have a different configuration or arrangement of components.

As noted above in relation to FIG. 3 and FIG. 5, the input channel 304 is configured to receive a continuous input stream of events related to an application and generate a set of one or more event batches from the continuous input stream of events. In an embodiment, the event batch determinator module 310 in the input channel 304 may be configured to generate the event batches by introducing checkpoint marker events at pre-determined intervals of time into the continuous input event stream.

The CQL processor 306 may be configured to process the set of events in an event batch. As noted above, the processing of events may include processing the checkpoint marker event in each event batch. Upon detecting that the checkpoint marker event has been completely processed by the lineage tracking module 312, the lineage tracking module 312 generates a checkpoint end marker event. Upon receiving the checkpoint end marker event, the output channel 308 transmits a checkpoint acknowledgement message to the input channel 304. This triggers the generation of a snapshot 320 of the current state of the system. In an embodiment, the snapshot 320 of the current state of the system may be stored in the form of log based storage 322 (synopsis logs) to a cluster of machines.

In one embodiment of the present disclosure, the event processing system may include a snapshot duration determinator module 904. The snapshot duration determinator module 904 may be configured to determine how often a 'full snapshot' (e.g., 320) of the current state of the system is to be generated. For instance, the snapshot duration determinator module 904 may be configured to trigger the generation of a 'full snapshot' every time a set of events in an event batch are processed. In some examples, snapshot duration determinator module 904 may be configured to trigger the generation of a 'full snapshot' after a pre-determined number of (e.g., 3) event batches have been processed. In some examples, the snapshot duration determinator module 904 may be configured to trigger the generation of a 'full snapshot' or a 'journaled snapshot' of the current state of the system, as discussed above. For instance, the snapshot duration determinator module 904 may be configured to trigger the generation of a 'full snapshot' for a first batch of events that have been processed and then trigger the generation of a combination of 'full snapshots' and 'journaled snapshots' for subsequent batches of events. In other examples, the snapshot duration determinator module 904 may be configured to trigger the generation of a 'full snapshot' at pre-configured intervals of time (for e.g., after a pre-determined number of (e.g., 10) event batches have been processed).

As noted above, the event processing system may generate a 'journaled snapshot' corresponding to operators that have been identified as 'journaled operators' during the processing of the events in an event batch by a continuous query and a 'full snapshot' corresponding to those operators that have been identified as 'non-journaled operators' during the processing of the events.

In some embodiments, the event processing system may be configured to store 'synopsis information' and 'mutable state information' as part of the snapshot. The 'synopsis information' and 'mutable state information' correspond to information related to the operators of the continuous query that process events in an event batch. For instance, 'synopsis information' may include, for example, a list data structure used by a RangeWindow synopsis representing the events in a range window related to an operator, while 'mutable state information' may include, for example, the last timestamp that operators maintain to remember the last timestamp of a processed event, related to the operator. In some examples, the event processing system may be configured to store either 'synopsis information' or 'mutable state information' related to an operator depending on whether the operator is able to generate a 'journaled snapshot' or a 'full snapshot' of the current state of the system. In one embodiment, the event processing system may be configured to store 'synopsis information' related to an operator that supports the generation of a 'journaled snapshot' of the current state of the system and 'mutable state information' related to an operator that supports the generation of a 'full snapshot' of the current state of the system.

In some examples, an operator may be able to generate either a 'journaled snapshot' or a 'full snapshot' of the current state of the system. FIG. 10 is an exemplary table that depicts the generation of the different types of snapshots for different types of operators of a continuous query that are identified during the processing of events in an event stream, in accordance with an embodiment of the present disclosure.

As illustrated in FIG. 10, B1, B2, B3 and B4 represent exemplary event batches generated by the event processing system. The operator type column identifies set of operators of the continuous query that have been identified by the event processing system during the processing of events in an event stream. In the example shown in FIG. 10, the set of operators include a Window operator, an Aggr operator, and a groupBy operator. As described herein, an event stream represents a continuous stream of events. The Window operator provides a way to select a subset of events (e.g., the last N events) for further processing. The output from the Window operator is a set of events that can be used for further processing such as joining event streams or calculating aggregate functions like sum and average. For instance, a window operator can collect all events (e.g., sales orders for a product) placed in the last hour and output the average value of the order once every hour. The Aggr operator is an operator that can compute an aggregate function such as sum, average, count, max on a set of events of an event stream. The groupBy operator refers to an operator than can perform the grouping and aggregation of events in an event stream.

In one embodiment of the present disclosure, the event processing system may be configured to generate a 'full snapshot' for all the identified operators for a first batch of events, B1. For subsequent batches of events, B2 and B3, the event processing system may be configured to generate 'full snapshots' corresponding to the non-journaled operators (e.g., Aggr operator) and 'journaled snapshots' corresponding to the journaled operators (e.g., Window operator, groupBy operator). As further indicated in the above example, in some embodiments, the event processing system may be configured to generate a 'full snapshot' for all the operators identified during the processing of the batch of events, B4, regardless of whether the operator is a 'journaled operator' or a 'non-journaled operator.' The generation of four event batches by the event processing system shown in FIG. 10 is for illustrative purposes. In other embodiments, the event processing system may be configured to generate fewer or more number of event batches from an event stream.

As noted above, a desirable level of fidelity is precise recovery so that downstream clients see exactly the same stream of events that would have been produced if no upstream failure had occurred and no missed events and duplicate events were allowed. Thus, it is desirable to provide precise recovery of continuous queries without impacting performance too greatly. Typically, the precise recovery of a continuous query can be provided if the state of the operators are restored on other peer machines in a cluster. In one embodiment, the event processing system defines the state of the operators and preserves this state on a fault tolerant storage medium having low latency read write capability.

Existing continuous query systems rely on an active-active approach where a single continuous query runs synchronously on two nodes of cluster. One node acts as a backup of another node by running the same set of continuous query operators on same stream of input data. This typically results in only 50% utilization of cluster hardware.

In an embodiment of the present disclosure, the above issue can be addressed by performing log based fast state storage for preserving the state of the operators of a continuous query in a distributed fault tolerant storage medium. In an embodiment, the process of log based fast state storage may be performed by the event processing system (e.g., 900). Using log based approach, the state is persisted into the storage medium in append only mode with relevant data and metadata for later recovery.

A continuous query can be represented as a graph of continuously running operators where each stateful operator maintains its own state in the form of an in-memory synopsis. To recover a failed query, the event processing system has to recover the in-memory synopsis of all stateful operators of a query graph. As noted above, the current state of the system can be represented as a composite representation of three components: an input queue state, an operator state or synopsis, or an output queue state related to events in an event stream Operator synopsis refers to defining the state of each stateful continuous operator in the form of an in-memory data structure referred to herein as 'Operator synopsis.' At any time t, the synopsis of an operator maintains the collection of input events and metadata relevant to the operation of the operators. Operator synopsis defines the state of a continuous query and can be used to support failover semantics by the event processing system. As each operator synopsis represents an abstraction for an in-memory data structure, the event processing system maps this data structure to an append-only log-based storage. For every operation on the synopsis data structure, the event processing system uses a fast write capability to append the change event to distributed and fault storage. The event processing system maps each operator synopsis to an append-only data structure of persistent medium.

Before failover, the event processing system continually receives input data streams and updates the state of operators accordingly. After completely processing an event batch from the input stream for a continuous query, the event processing receives a batch end notification from the input module and starts persisting the operator synopsis for all continuous operators in that query. For each operator synopsis, the event processing system computes a transaction which contains all change events for the associated data structure of the synopsis and writes it back to a container (e.g., a topic) in append-only style. In some examples, the event processing system may not attempt to update existing log entries in the persisted state.

In some embodiments, the event processing system defines the state of a query by choosing state components from the above three options on the basis of failover semantics requirements. The failover semantics in the event processing system can be defined on the basis of processing of input events either a) exactly once, b) At-least once and c) At-most once.

In an embodiment, the event processing system may process incoming events from an input stream exactly once. The continuous query emits an output event by processing an input event exactly once in the query graph. To provide exactly once semantics, the event processing system defines the continuous query state as a combination of Operator Synopsis, unprocessed event batches and output sequencing metadata.

In some embodiments, the event processing system may process input events from an input stream at least once. The continuous query may emit the duplicate output event corresponding to an input event which might be processed multiple times in the course of state recovery of continuous operators. To provide at-least semantics, the event processing system defines the continuous query state as combination of operator synopsis and unprocessed input event batches. Inclusion of output sequencing metadata is not necessary since duplicates may be allowed using this semantic.

In some embodiments, the event processing system may process input events from an input stream at most once. The continuous query may skip some output events corresponding to input events which were not processed during failover process. To provide at-most once semantics, the event processing system defines the continuous query state as operator synopsis as these semantics allow skipping some output events during the failover process.

In an embodiment, the event processing system may perform reconstruction of operator synopsis from Log-based state storage. This process includes initializing a query plan of the continuous query to be recovered before starting to process the input stream. For instance, during initialization of the query plan, the event processing system can create and initialize the in-memory data structures for each continuous operator in the Directed Acyclic Graph (DAG) of the query plan. The process includes reading a log of change events to initialize an in-memory data structure of a continuous operator. During this process, the event processing system may initialize the operator synopsis by reading messages from a persistent log of change events starting from a starting marker for the operator state. The starting marker donates the offset in the persistent log which marks the starting point in the log to include all change events which are necessary to rebuild the synopsis of the continuous query operator. In an embodiment, the event processing system may read these events one by one and update the in-memory data structure. At the end of reading the log, the in-memory data structure of the continuous operator is initialized.

In some embodiments, the process further includes traversing the Directed Acyclic Graph of continuous query operators in topological order to initialize the query operators. At the end of traversal, the complete DAG corresponding to the initial query and the process of operator synopsis restoration is complete. Upon completely restoring the operator synopsis, the process may include processing the incoming data in the form of event batches. In an embodiment, the process may include performing a decision by the event processing system about which batch to read from, on the basis of the failover semantics. For instance, in one embodiment, in the case of at-most once, the event processing system will read the batch corresponding to latest offset from a container (e.g., a Kafka topic). Since events having the latest offset from the container are read, the event processing system might miss some events from the input stream which were received during the recovery time of continuous query. In another embodiments, the event processing system may read the first unprocessed or partially processed event batch from the container in the case of exactly-once or at-least once semantics. To support exactly-once semantics, the event processing system may utilize output sequencing as discussed above, in some examples.

Illustrative Process

Figure 11:
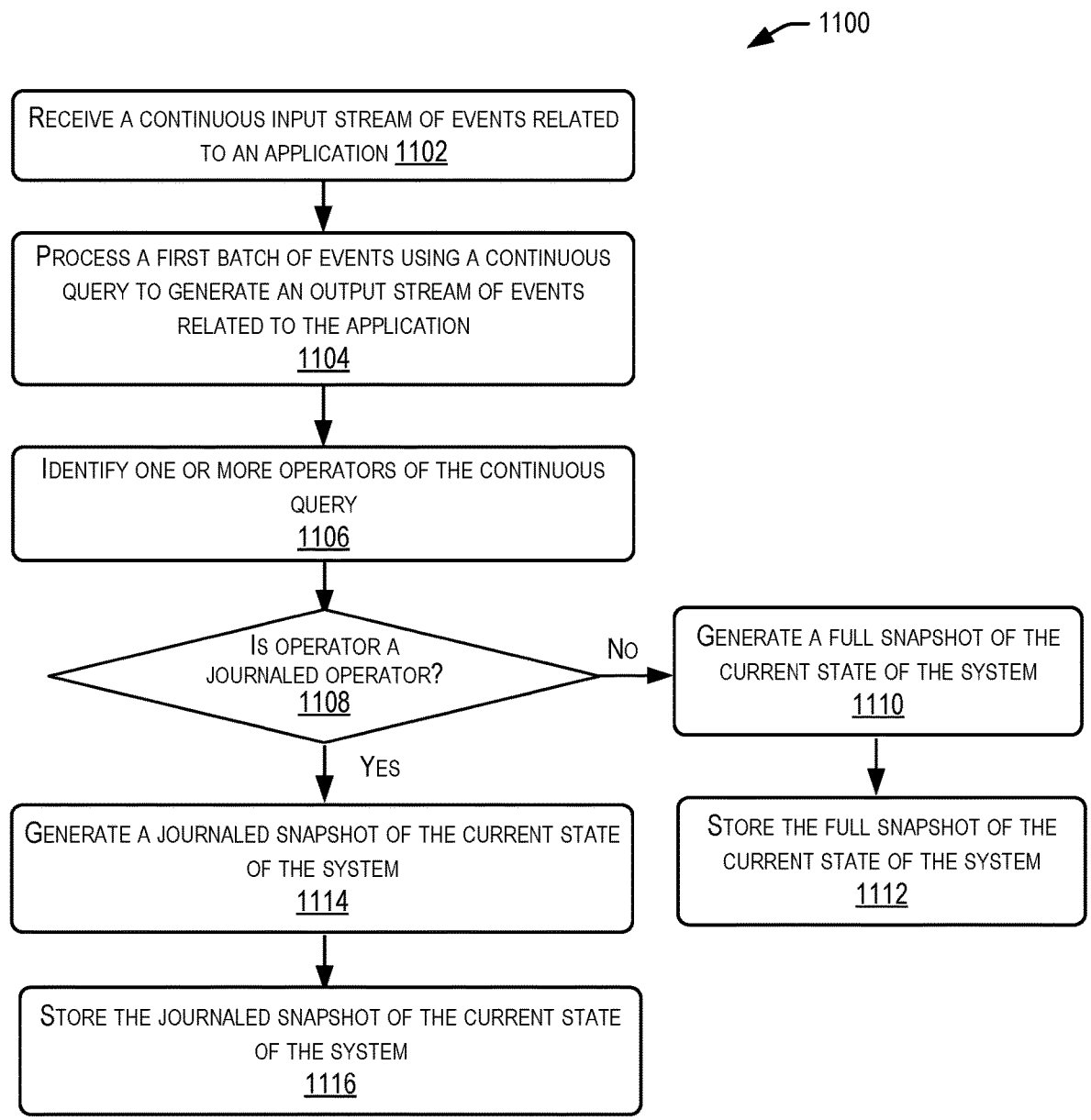
FIG. 11 illustrates an example flow diagram showing process 1100 for providing event processing services according to certain embodiments of the present invention.

FIG. 11 illustrates an example flow diagram showing process 1100 for providing event processing services according to certain embodiments of the present invention. This process is illustrated as a logical flow diagram, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the event processing system (e.g., utilizing at least the input channel 304, the event batch determinator 310, the lineage tracking module 312, the output sequence number generator 502, the event recovery module 504 and the snapshot duration determinator module 904) shown in at least FIG. 2, FIG. 3, FIG. 5, FIG. 9 (and others) may perform the processes 600, 700 and 800 of FIGS. 6-8 respectively.

FIG. 11 illustrates a flow diagram of an example process 1100 for providing event processing services in accordance with one embodiment of the present disclosure. The process at 1100 may begin at 1102 when a continuous input stream of events related to an application is received by the event processing system. For instance, the event processing system may receive a continuous input stream of events from one or more event sources (204, 206 or 208) as shown in FIG. 2. Upon receiving the continuous input stream of events, at 1104, the event processing system processes a first batch of events using a continuous query to generate an output stream of events related to the application. At 1106, the event processing system identifies one or more operators of the continuous query. For instance, the event processing system may identify the operators of a continuous query from a physical query plan generated for the query. As noted above, the physical query plan may include a directed acyclic graph (DAG) of physical operators of the continuous query.

In some examples, at 1108, the event processing system determines if an operator of the continuous query is a 'journaled operator.' A 'journaled snapshot' is then generated for the first batch of events by the snapshot duration determinator 904. As noted above, a 'journaled operator' refers to an operator that is capable of creating a 'journaled snapshot.' If the operator is identified to be a 'journaled operator,' then at 1114, the event processing system generates a 'journaled snapshot' of the current state of the system corresponding to the execution of the 'journaled operator' on a set of events (i.e., the first batch of events) of the event stream. In some examples, at 1116, the event processing system stores the 'journaled snapshot' of the current state of the system. If the operator is identified to be a 'non-journaled operator,' then at 1116, the event processing system generates a 'full snapshot' of the current state of the system for the set of events (for e.g., the first batch of events) of the event stream. In some examples, at 1112, the event processing system stores the 'full snapshot' of the current state of the system.

Figure 12:
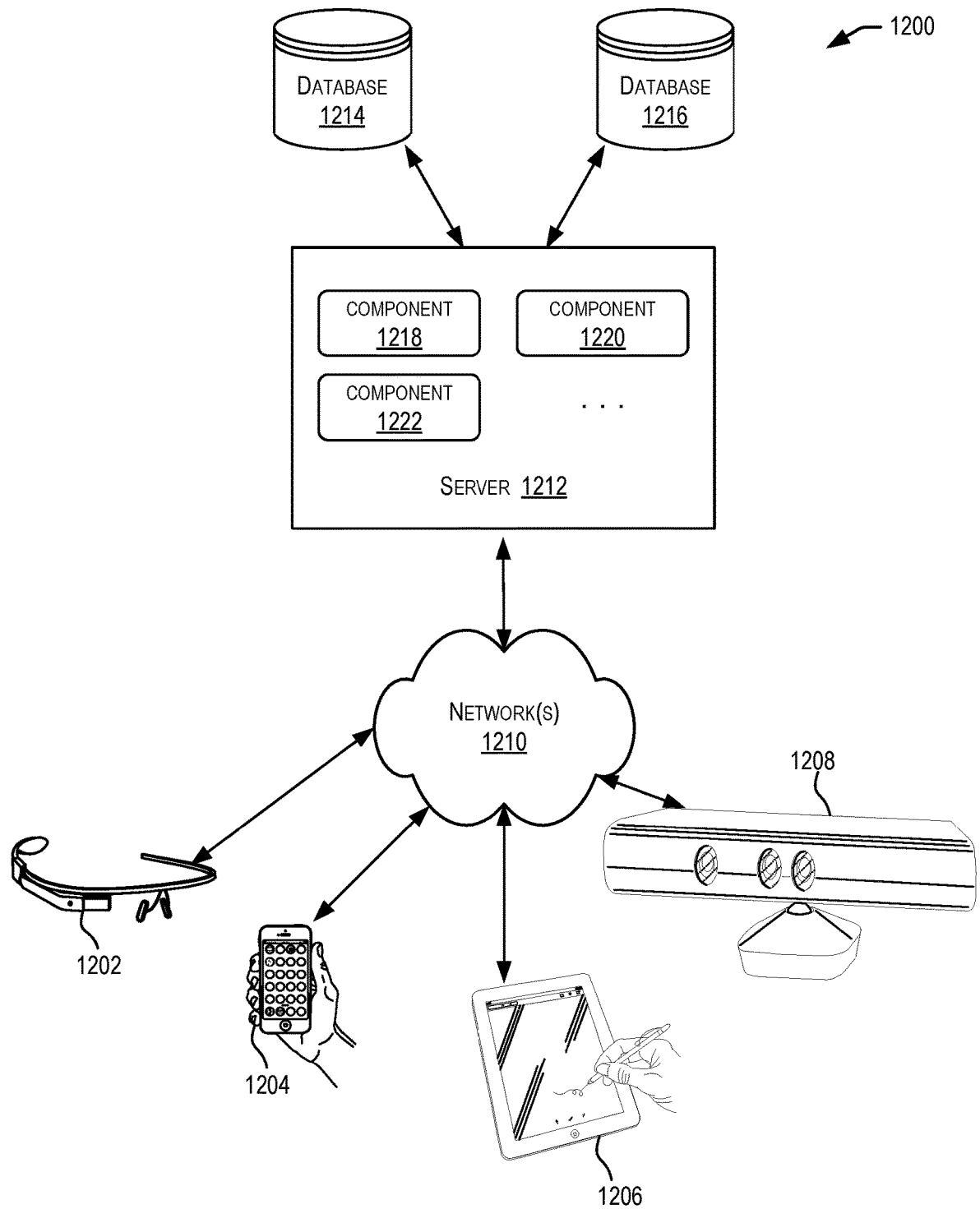
FIG. 12 depicts a simplified diagram of a distributed system 1200 for implementing an embodiment of the present disclosure.
Figure 13:
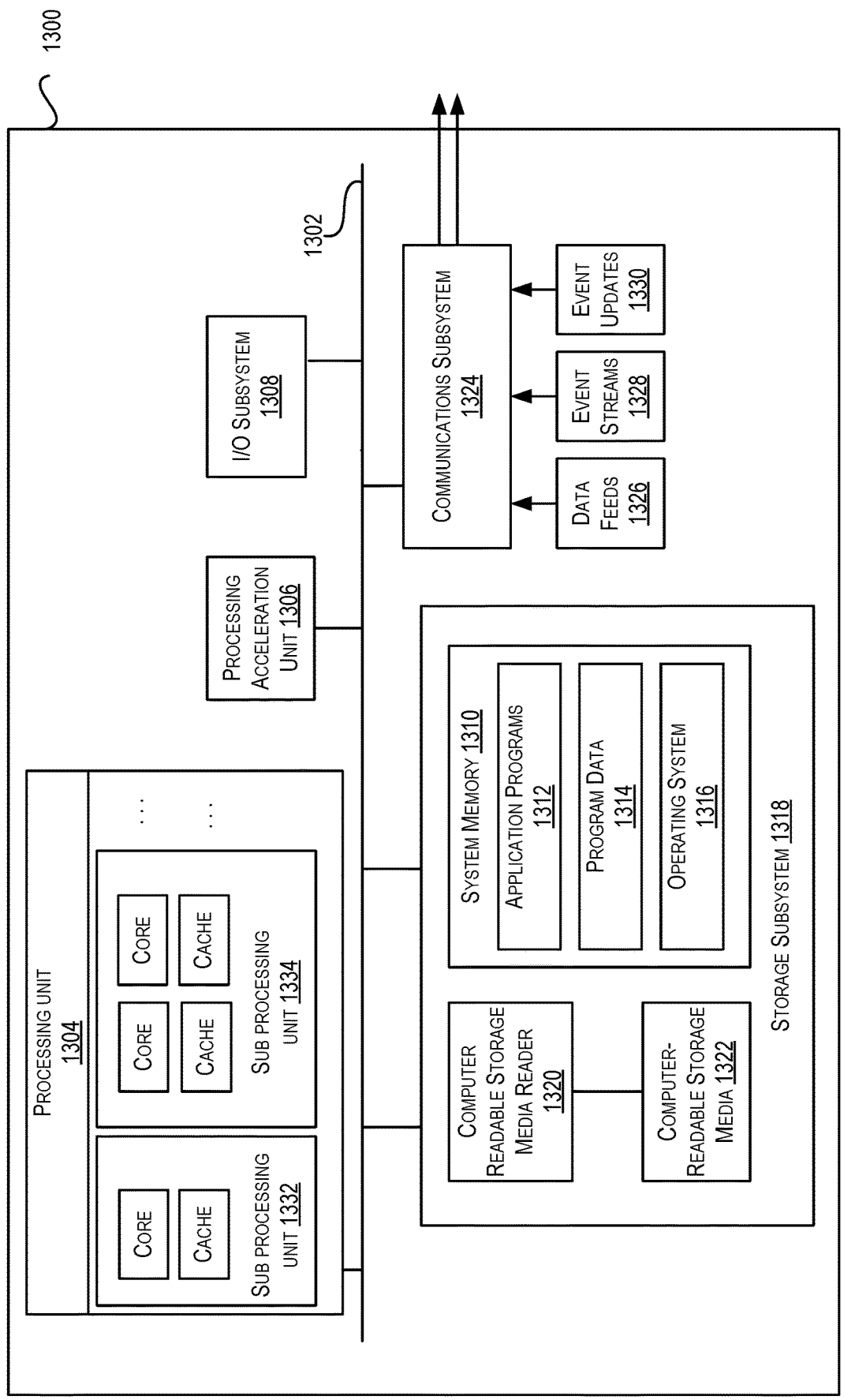
FIG. 13 illustrates an exemplary computer system 1300 that may be used to implement an embodiment of the present invention.

FIGS. 12-13 illustrate aspects of example environments for implementing aspects of the present invention in accordance with various embodiments. FIG. 12 depicts a simplified diagram of a distributed system 1200 for implementing an embodiment of the present disclosure. In the illustrated embodiment, the distributed system 1200 includes one or more client computing devices 2002, 2004, 2006, and 2008, which are configured to execute and operate a client application such as a web browser, proprietary client (e.g., Oracle Forms), or the like over one or more network(s) 1210. The server 1212 may be communicatively coupled with the remote client computing devices 1202, 1204, 1206, and 1208 via network 1210.

In various embodiments, the server 1212 may be adapted to run one or more services or software applications such as services and applications that provide identity management services. In certain embodiments, the server 1212 may also provide other services or software applications can include non-virtual and virtual environments. In some embodiments, these services may be offered as web-based or cloud services or under a Software as a Service (SaaS) model to the users of the client computing devices 1202, 1204, 1206, and/or 1208. Users operating the client computing devices 1202, 1204, 1206, and/or 1208 may in turn utilize one or more client applications to interact with the server 1212 to utilize the services provided by these components.

In the configuration depicted in FIG. 12, the software components 1218, 1220 and 1222 of system 1200 are shown as being implemented on the server 1212. In other embodiments, one or more of the components of the system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

The client computing devices 1202, 1204, 1206, and/or 1208 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1210.

Although distributed system 1200 in FIG. 12 is shown with four client computing devices, any number of client computing devices may be supported. Other devices, such as devices with sensors, etc., may interact with the server 1212.

The network(s) 1210 in the distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1212 can include one or more virtual machines running virtual operating systems, or other computing architectures involving virtualization. One or more flexible pools of logical storage devices can be virtualized to maintain virtual storage devices for the server. Virtual networks can be controlled by the server 1212 using software defined networking. In various embodiments, the server 1212 may be adapted to run one or more services or software applications described in the foregoing disclosure. For example, the server 1212 may correspond to a server for performing processing as described above according to an embodiment of the present disclosure.

The server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 1212 may include one or more applications to analyze and consolidate data feeds and/or event updates received from users of the client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1212 may also include one or more applications to display the data feeds and/or real-time events via one or more display devices of the client computing devices 1202, 1204, 1206, and 1208.

The distributed system 1200 may also include one or more databases 1214 and 1216. These databases may provide a mechanism for storing information such as user identity information, and other information used by embodiments of the present invention. Databases 1214 and 1216 may reside in a variety of locations. By way of example, one or more of databases 1214 and 1216 may reside on a non-transitory storage medium local to (and/or resident in) the server 1212. Alternatively, the databases 1214 and 1216 may be remote from the server 1212 and in communication with the server 1212 via a network-based or dedicated connection. In one set of embodiments, the databases 1214 and 1216 may reside in a storage-area network (SAN). Similarly, any necessary files for performing the functions attributed to the server 1212 may be stored locally on the server 1212 and/or remotely, as appropriate. In one set of embodiments, the databases 1214 and 1216 may include relational databases, such as databases provided by Oracle, that are adapted to store, update, and retrieve data in response to SQL-formatted commands.

FIG. 13 illustrates an exemplary computer system 1300 that may be used to implement an embodiment of the present invention. In some embodiments, computer system 1300 may be used to implement any of the various servers and computer systems described above. As shown in FIG. 13, computer system 1300 includes various subsystems including a processing subsystem 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 may include tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1304 controls the operation of computer system 1300 and may comprise one or more processing units 1332, 1334, etc. A processing unit may include be one or more processors, including single core or multicore processors, one or more cores of processors, or combinations thereof. In some embodiments, processing subsystem 1304 can include one or more special purpose co-processors such as graphics processors, digital signal processors (DSPs), or the like. In some embodiments, some or all of the processing units of processing subsystem 1304 can be implemented using customized circuits, such as application specific integrated circuits (ASICs), or field programmable gate arrays (FPGAs).

In some embodiments, the processing units in processing subsystem 1304 can execute instructions stored in system memory 1310 or on computer readable storage media 1322. In various embodiments, the processing units can execute a variety of programs or code instructions and can maintain multiple concurrently executing programs or processes. At any given time, some or all of the program code to be executed can be resident in system memory 1310 and/or on computer-readable storage media 1310 including potentially on one or more storage devices. Through suitable programming, processing subsystem 1304 can provide various functionalities described above for dynamically modifying documents (e.g., webpages) responsive to usage patterns.

In certain embodiments, a processing acceleration unit 1306 may be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term "input device" is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information that is used by computer system 1300. Storage subsystem 1318 provides a tangible non-transitory computer-readable storage medium for storing the basic programming and data constructs that provide the functionality of some embodiments. Software (programs, code modules, instructions) that when executed by processing subsystem 1304 provide the functionality described above may be stored in storage subsystem 1318. The software may be executed by one or more processing units of processing subsystem 1304. Storage subsystem 1318 may also provide a repository for storing data used in accordance with the present invention.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM) or dynamic random access memory (DRAM).

By way of example, and not limitation, as depicted in FIG. 13, system memory 1310 may store application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1322 may store programming and data constructs that provide the functionality of some embodiments. Software (programs, code modules, instructions) that when executed by processing subsystem 1304 a processor provide the functionality described above may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1322 may provide storage of computer-readable instructions, data structures, program modules, and other data for computer system 1300.

In certain embodiments, storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for storing computer-readable information.

In certain embodiments, computer system 1300 may provide support for executing one or more virtual machines. Computer system 1300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1300. Accordingly, multiple operating systems may potentially be run concurrently by computer system 1300. Each virtual machine generally runs independently of the other virtual machines.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. Additionally, communication subsystem 1324 may be used to communicate notifications of successful logins or notifications to re-enter a password from the privileged account manager to the requesting users.

Communication subsystem 1324 may support both wired and/or wireless communication protocols. For example, in certain embodiments, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

Communication subsystem 1324 can receive and transmit data in various forms. For example, in some embodiments, communications subsystem 1324 may receive input communication in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system comprising:
a memory storing a plurality of instructions; and
one or more processors configured to access the memory, wherein the one or more processors are further configured to execute the plurality of instructions to at least:
receive a continuous input stream of events related to an application;
insert a checkpoint marker event into the continuous input stream of events according to an interval, the interval based at least in part on a latency requirement of the application;
generate a set of one or more event batches based at least in part on the checkpoint marker event;
transmit an output stream of events based at least in part on the continuous input stream of events and comprising an output event associated with an output sequence number; and
in response to receiving an indication of failure of the system, transmit a set of one or more output events of the output stream based at least in part on a current sequence number of a most recently transmitted output event and a last output sequence number of an output event corresponding to a most recently processed batch of input events.

2. The system of claim 1, wherein the one or more processors are further configured to not include one or more output events in the set of one or more output events to be transmitted.

3. The system of claim 1, wherein the one or more processors are further configured to transmit output events from the current sequence number of the most recently transmitted output event in the output stream of events based at least in part on receiving the indication of failure of the system.

4. The system of claim 1, wherein the one or more processors are further configured, in response to the indication of failure, to reconstruct a state of the system based at least in part on a synopsis log.

5. The system of claim 4, wherein the synopsis log comprises a snapshot of a particular duration, and wherein a separate synopsis snapshot is generated to reconcile the state.

6. The system of claim 4, wherein, while reconstructing the state of the system based at least in part on the synopsis log, the one or more processors are further configured to reconstruct a synopsis for a range window operator by replaying events.

7. The system of claim 4, wherein, while reconstructing the state of the system based at least in part on the synopsis log, the one or more processors are further configured to:
initialize a query plan of a continuous query to be recovered; and
initialize, based at least in part on a log of change events, an in-memory data structure of a continuous operator.

8. The system of claim 7, wherein, while initializing the query plan, the one or more processors are further configured to create and initialize in-memory data structures for each continuous operator in a Directed Acyclic Graph (DAG) of the query plan.

9. The system of claim 1, wherein the checkpoint marker event represents information related to an input event in the continuous input stream of events.

10. The system of claim 1, wherein the one or more processors are further configured to:
process the checkpoint marker event;
transmit an acknowledgement message indicating completion of processing of a first event batch in the set of one or more event batches based at least in part on the processing of the checkpoint marker event; and
generate a snapshot of a current state of the system.

11. The system of claim 10, wherein the snapshot of the current state of the system comprises information related to at least one of an input queue state, an operator state, or an output queue state related to at least a first batch of events.

12. A method, comprising:
receiving a continuous input stream of events related to an application;
inserting a checkpoint marker event into the continuous input stream of events according to an interval, the interval based at least in part on a latency requirement of the application;
generating a set of one or more event batches based at least in part on the checkpoint marker event;
transmitting an output stream of events based at least in part on the continuous input stream of events and comprising an output event associated with an output sequence number; and
in response to receiving an indication of system failure, transmitting a set of one or more output events of the output stream based at least in part on a current sequence number of a most recently transmitted output event and a last output sequence number of an output event corresponding to a most recently processed batch of input events.

13. The method of claim 12, further comprising, in response to the indication of system failure, reconstructing a system state based at least in part on a synopsis log.

14. The method of claim 13, further comprising one or more of:
generating a separate synopsis snapshot to reconcile the state; or
reconstructing a synopsis for a range window operator by replaying events.

15. The method of claim 13, further comprising:
initializing a query plan of a continuous query to be recovered;
initializing, based at least in part on a log of change events, an in-memory data structure of a continuous operator; and
creating and initializing in-memory data structures for each continuous operator in a Directed Acyclic Graph (DAG) of the query plan.

16. The method of claim 12, further comprising:
receiving, from a primary server, an indication that a first event has been processed;
in response to receiving the indication that the first event has been processed, discarding a queued event from the output stream, the queued event corresponding to the first event; and
in response to the indication of system failure, determining the set of one or more output events of the output stream to be transmitted, wherein the output stream excludes the discarded queued event.

17. A non-transitory computer-readable storage memory storing a plurality of instructions executable by one or more processors, the plurality of instructions comprising instructions that cause the one or more processors to at least:
receive a continuous input stream of events related to an application;

insert a checkpoint marker event into the continuous input stream of events according to an interval, the interval based at least in part on a latency requirement of the application;

generate a set of one or more event batches based at least in part on the checkpoint marker event;

transmit an output stream of events based at least in part on the continuous input stream of events and comprising an output event associated with an output sequence number; and in response to receiving an indication of system failure, transmit a set of one or more output events of the output stream based at least in part on a current sequence number of a most recently transmitted output event and a last output sequence number of an output event corresponding to a most recently processed batch of input events.

18. The non-transitory computer-readable storage memory of claim 17, further comprising instructions that cause the one or more processors to at least, in response to the indication of system failure, reconstruct a system state based at least in part on a synopsis log.

19. The non-transitory computer-readable storage memory of claim 18, further comprising instructions that cause the one the one or more processors to perform one or more of:

generating a separate synopsis snapshot to reconcile the system state; or reconstructing a synopsis for a range window operator by replaying events.

20. The non-transitory computer-readable storage memory of claim 18, further comprising instructions that cause the one the one or more processors to:

initialize a query plan of a continuous query to be recovered;

initialize, based at least in part on a log of change events, an in-memory data structure of a continuous operator; and create and initialize in-memory data structures for each continuous operator in a Directed Acyclic Graph (DAG) of the query plan.

* * * * *